(12) United States Patent
Jung et al.

(10) Patent No.: US 8,706,761 B1
(45) Date of Patent: Apr. 22, 2014

(54) INFORMATION DISCOVERY BASED ON INVESTMENTS IN AN INVENTION NETWORK

(75) Inventors: Edward K. Y. Jung, Bellevue, WA (US); Daniel B. Cook, Seattle, WA (US)

(73) Assignee: IVP Holdings III LLC, Bellevue, WA (US)

( * ) Notice: Subject to any disclaimer, the term of this patent is extended or adjusted under 35 U.S.C. 154(b) by 465 days.

(21) Appl. No.: 12/958,199

(22) Filed: Dec. 1, 2010

Related U.S. Application Data

(60) Provisional application No. 61/265,680, filed on Dec. 1, 2009.

(51) Int. Cl.
*G06F 17/30* (2006.01)
*G06F 7/00* (2006.01)

(52) U.S. Cl.
CPC .. *G06F 7/00* (2013.01); *G06F 17/30* (2013.01)
USPC ............................ 707/790; 707/821; 719/319

(58) Field of Classification Search
CPC .............. G06F 3/00; G06F 7/00; G06F 17/30
USPC ............. 707/999.1, 999.2, 790, 821; 719/319
See application file for complete search history.

(56) References Cited

U.S. PATENT DOCUMENTS 5,991,751 A * 11/1999 Rivette et al. ........................ 1/1

* cited by examiner

*Primary Examiner* — Daniel Felten
(74) *Attorney, Agent, or Firm* — Lowe Graham Jones PLLC

(57) ABSTRACT

Methods, systems, and techniques for discovering information using structured investments in an invention network are provided. Example embodiments provide an investment tool which allows users to invest currency in disclosures, ideas, topics, inventions, patent applications, patents, etc. which they determine will ultimately be successful. In one embodiment, the inventions are organized by schema to enable participants to invest or otherwise participate according to particular aspects. These aspects are typically areas in which the participant has or will have established a reputation for successful results in accordance with some future outcome.

51 Claims, 10 Drawing Sheets

A. Opinion Market 1 - Without Reputation – all reviews count equally

A: 2  ⎫
B: 4  ⎬ 501
C: 4  ⎪
D: 4  ⎭

Average: 3.5
StdDev: 1.0

B. Opinion Market 2 - With Reputation – reviews are multiplied or weighted by reputation 502

(10) A: 22222 22222
(13) B: 44444 44444 444
(10) C: 44444 44444
(75) D: 44444 44444 44444 44444 44444 44444 44444 44444 44444 44444 44444 44444 44444 44444 44444

503

Average: 3.8
StdDev: .58

*Fig. 5A*

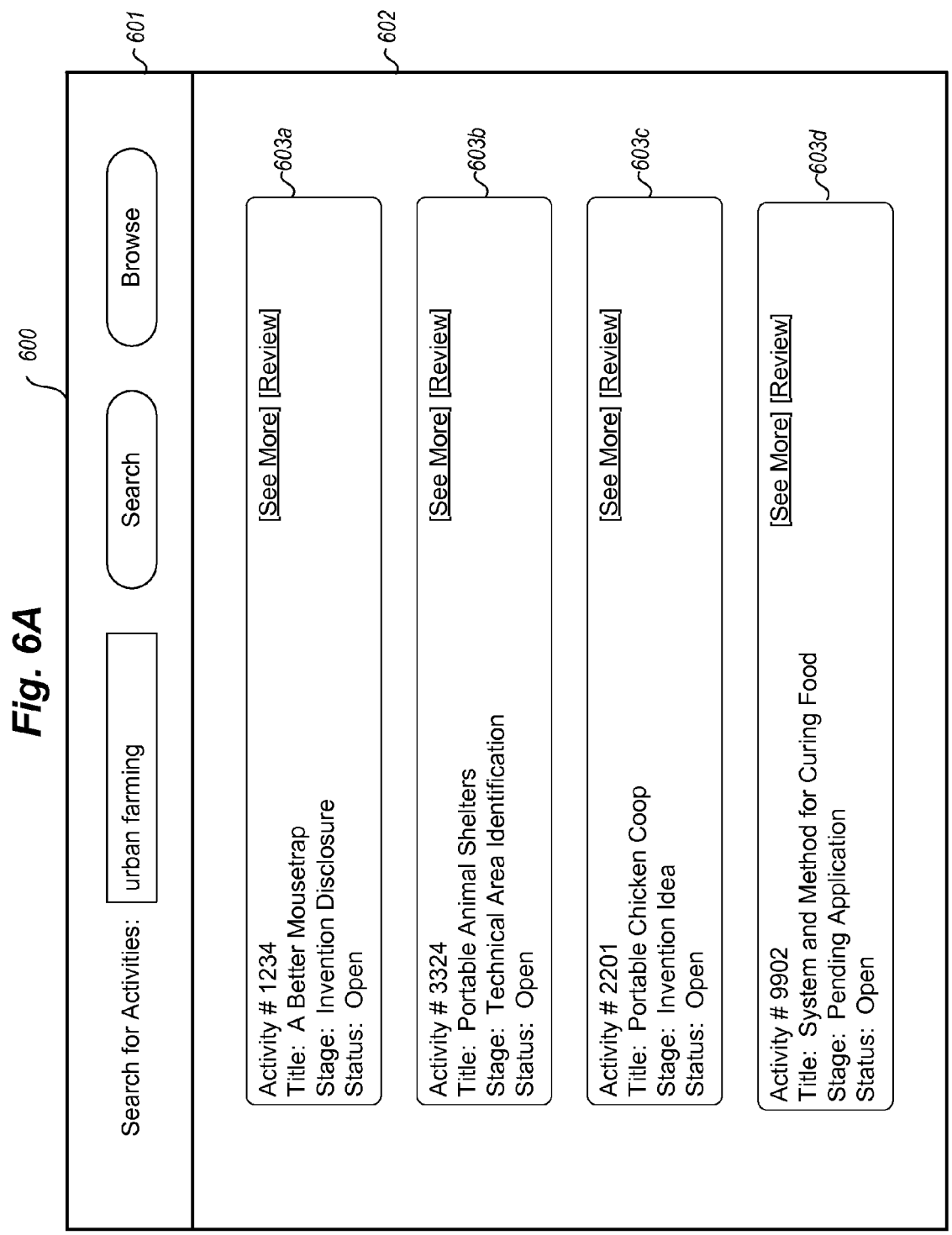

*Fig. 6B*

Search for Activities: [    ]    [ Search ]    [ Browse ]

600

610

Activity # 1234
Title:    A Better Mousetrap
Stage:   Invention Disclosure
Status:  Open

611

Description:

This invention is directed to improved techniques for catching pests, particularly mice. The basic idea is to use a cardboard box to ...

612

Reviewer: Please provide a written review, as well as a rating and an investment amount below. You will be paid 100 units for your review, as well as possibly a return on your investment.

*The cardboard box feature is particularly nice, I would have rated it higher if only ...*

Rating (1-5): [4]    Investment Amount: [10000]    [ Submit ]

613

INFORMATION DISCOVERY BASED ON INVESTMENTS IN AN INVENTION NETWORK

TECHNICAL FIELD

The present disclosure relates to methods, systems, and techniques for information discovery and, in particular, to methods systems, and techniques for information discovery using investments in invention lifecycle-related activities.

BACKGROUND

Suppose it were possible for companies to figure out ahead of time which ideas and inventions to spend their money on. They would then be able to develop portfolios of patents that could be licensed for great sums of money; not waste money on patenting ideas that are easily worked around; etc. Today, companies figure out what inventions to patent using a variety of techniques including setting priorities based upon information that they can glean from a variety of sources including the market, prior success of products, customers, etc. Often, large companies employ patent committees that vet out ideas based upon a priority system, often aligned with perceived importance of current and future products, budget, etc. The process is far from a science, and typically costly mistakes are made early in the process without being caught until the money has already been spent.

BRIEF DESCRIPTION OF THE DRAWINGS

FIGS. 5A-5B illustrate the use of reputation in opinion markets provided by example embodiments of an Invention Lifecycle Support System.

FIGS. 6A-6C illustrate example screen displays provided by an example embodiment of an Invention Lifecycle Support System.

DETAILED DESCRIPTION

Figure 1:
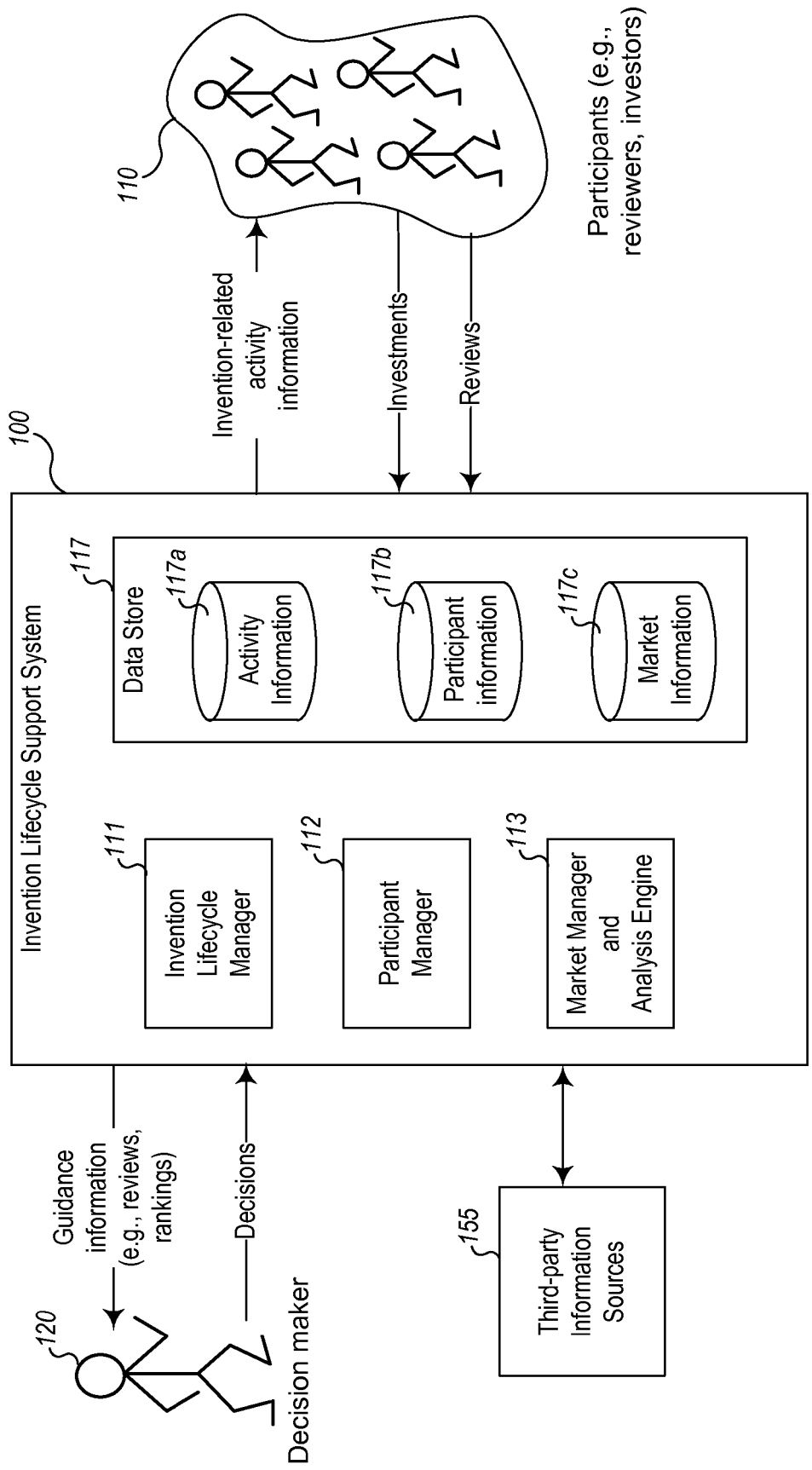
FIG. 1 illustrates an example block diagram of an example embodiment of an Invention Lifecycle Support System.

Embodiments described herein provide methods, systems, and techniques for discovering information and decision making using a structured approach to investing in various phases of an invention, including from an initial idea to licensing an issued patent. Example embodiments provide a marketplace for investing in ideas, inventions, and other invention-related activities. The marketplace provides investment tools, processes, a reward and incentive structure, and the like, in order to let the economics of a natural marketplace help determine which inventions should be pursued as patents, which should be licensed, where to spend money, and the like. By analyzing data from a large market of participants, the discovered information can be used to experiment with and determine with greater accuracy the relationships between factors contributing to the ultimate success of inventions. The following describes one embodiment of such a structured approach to investing in inventions known as the Invention Network.

In one embodiment, the Invention Network is provided and/or facilitated by an Invention Lifecycle Support System ("ILSS"). The ILSS facilitates decision-making in the context of an invention lifecycle, including the allocation of resources amongst multiple inventions and/or activities related to those inventions. An invention lifecycle may include various activities (herein sometimes referred to as "invention lifecycle-related activities" or simply, "invention activities") performed during various phases or stages of the inventive process. Invention activities may include activities that occur before invention conception, such as the identification of technical, economic, or social trends, or the determination of topics or technical areas ripe for invention. Invention activities may further include activities that occur during or after invention conception, such as invention idea generation, idea evaluation, patent preparation, patent prosecution, patent evaluation, licensing, and the like.

In some embodiments, the ILSS utilizes a market-based approach to facilitate such decision-making. In particular, the ILSS may manage an invention market, in which market participants invest in various invention activities, thereby indicating a predicted measure (e.g., likelihood) of success of each of the various invention activities. Based on the levels of investment in various activities, the ILSS can select (or facilitate the selection of by, for example, decision makers) candidate invention activities for further development, such as by indicating invention activities that have received relatively higher investments. Market participants may include investors, reviewers, analysts, trend identifiers, futurists and the like. Based on later evaluations of the success of a particular activity or based upon defined markers or criteria along the way, the market participants that invested in the activity are compensated, thereby increasing the wealth and/or reputation of participants who correctly predicted successful or valuable inventions.

As noted, various invention activities can be supported and/or represented by the ILSS. In general, invention activities ranging from the earliest phases of the invention lifecycle to the ultimate exploitation of intellectual property rights can be represented. Example invention activities include trend identification (e.g., identifying technical, business, or social trends that may impact demand), topic area identification (e.g., identifying technical or business areas where invention may be a profitable exercise), idea generation (e.g., the initial concept of a better mousetrap), idea evaluation (e.g., selecting between various competing better mousetraps), rights acquisition (e.g., patent preparation and/or prosecution), rights evaluation (e.g., identifying "good" patents), rights exploitation (e.g., licensing, litigation, selling), and the like. An example invention lifecycle is described with respect to FIG. 2, below.

In some example embodiments, the ILSS tools allow market participants to invest or otherwise participate in (for example, review, bet, or the like) invention activities based upon invention activity schema (herein sometimes referred to as just schema). Invention schema are multi-dimensional characterizations of invention activities. For example, an invention schema associated with a particular invention activity may partition the invention activity across a variety of characteristics (e.g., factors, groupings, notions, or the like) that define factors influential in determining the likelihood that the activity is going to be successful: for example, the likelihood the technology of the invention will actually happen, the difficulty to implement it, how many different alternatives exist, or how many different equal alternatives exist for marketing the product (to give one some sense of probability of how many marketing attempts might be needed before arriving at a successful marketing technique), or the like. Invention schema allow participants to participate (e.g., vote by investing, betting, or reviewing, determine acceptable risk versus reward, delegate participation to others, or participate as a group, and the like) on a more finely granular level so that they can participate or develop a reputation along lines that are not just broadly defined by types of technology or topic areas. Thus, the ILSS tools create a structured invention environment where participants can place a multi-variable "bet" on characteristics or factors of various predictions as if they were multi-variable securities. Hence, a by-product of the ILSS is that it promotes good predictors automatically along various measurements as defined by the schema.

In addition, in some example embodiments, the ILSS tools support the development of "ad-hoc" groups and predetermined, determined, and/or system defined groups that can cooperate as participants in investments and/or reviews. Ad-hoc groups may include participant groups organized along such lines as skills, schools, prior success, special interest groups, hobbies, experience, or the like. In addition, in some embodiments, participation can be delegated to others, for example, based upon others' reputations. Thus, at least two types of indirect participation are supported: participation in a group that operates like an investment fund and participation by delegation to another individual or group where the voting power (e.g., the investment money) remains with the person delegating.

The ILSS, or decision makers or others facilitated by the ILSS, can reward or compensate participants based upon successful predictions, investments, votes, bets, or the like. For the purposes of this disclosure, either betting or investing are contemplated and are not distinguished between unless specified. In some example embodiments, compensation and/or rewards are distributed along the lines of the schemas, risk profiles, delegates, groups, and the like. By compensating or rewarding according to schema, the ILSS is able to allocate interim rewards on an invention activity before knowing whether or not a particular invention as a whole can be deemed "successful." Thus, for example, rewards may be defined based upon risk, expertise/topic, and/or time in addition to, or instead of, estimating returns based upon percentages, straight line percentages, scaled returns and the like associated with a particular invention. Also, new models, statistically or otherwise, are contemplated for use with the ILSS.

1. Overview of Invention Lifecycle Support in an Example Embodiment

FIG. 1 illustrates an example block diagram of an example embodiment of an Invention Lifecycle Support System. In particular, FIG. 1 illustrates an Invention Lifecycle Support System ("ILSS") 100 that provides facilities (e.g., tools, software modules/systems, components, applications, data stores) that can be used by a human decision maker 120 or automated system component (not shown) to make decisions regarding the allocation of resources to or amongst one or more activities in an invention pipeline. The ILSS 100 performs at least some of its functions based on information received from human participants 110, including investors, reviewers, inventors, and other interested persons. In some embodiments, the ILSS 100 performs at least some of its functions based upon information received from external computing systems or information sources 155. The ILSS 100 includes an invention lifecycle manager 111, a participant manager 112, a market manager 113, and a data store 117. The data store 117 includes a invention activity information data store 117a, an participant information data store 117b, and a market information data store 117c. In some embodiments one or more of the components of the ILSS 100, including but not limited to the invention lifecycle manager 111, a participant manager 112, a market manager and analysis engine 113, and data store 117 may be implemented by humans or by automated components or processes, or assisted by some combination of both.

The invention lifecycle manager 111 manages an invention pipeline for the ILSS 100, such as by managing schemas or other structures that are used to establish an invention pipeline and track activities within that pipeline. For example, the invention lifecycle manager 111 may identify and track areas of active invention (e.g., technical areas). The manager 111 may further track the acquisition of rights in particular inventions, such as by tracking inventions as they move from trends to topics to ideas to patent applications to issued patent. The manager may further track inventions as they are exploited, such as by tracking licensing deals and the like.

The participant manager 112 manages (e.g., registers, tracks, authenticates, or identifies) information about the participants 110 and/or the decision maker 120. Information about participants is stored by the participant manager 112 in the participant information data store 117b. The participant manager 112 may facilitate and/or perform various functions, including the creation of an account and related data structures for a new participant; authentication of existing participants; payments or other compensation to/from participants; and the like.

In some embodiments, the participant manager 112 provides facilities by which participants may act on behalf of one another and/or act as groups. For example, in one embodiment, the participant manager 112 may allow one participant to delegate actions and/or investments to another participant. In another embodiment, the participant manager 112 may allow a participant to create an investment fund or pool that operates as a single participant but obtains value from and remits value to multiple other participants.

The participant manager 112 may also manage information about participant reputation. In some embodiments, each participant may have an associated reputation that is stored or otherwise represented by the participant manager 112. A person's reputation may be represented in various ways, such as with a numeric or alphabetic value. In some embodiments, reputation can be improved (e.g., increased) by the participant manager 112 based on various factors or events, such as when a participant correctly predicts the outcome or success of an invention activity, or based on indications or investments from other participants (e.g., an indication that one participant likes or dislikes a particular work product or investment made by another participant). The term "reputon" is sometimes used below to mean a representation of trust, reputation, and/or social standing.

The market manager and analysis engine 113 (referred to simply as the market manager 113) manages one or more invention markets. As noted, the ILSS may employ market-based approaches to analyze, perform or facilitate at least some of its functions. Here, the market manager 113 provides information about an invention-related activity (e.g., a description of an invention) to the participants 110, so that the participants 110 can invest in the activity in order to indicate their predictions regarding the future success of the described activity. The market manager 113 then receives indications of the investments made by the participants 110, and stores them in the market information data store 117c. Investments may be made in real or virtual currency or other representation of value. In addition, the market manager analyzes the success or strength of the investments, reviews, or other information provided by participants 110 to draw information from the market supported by the ILSS 100.

Participants 110 may provide other or additional types of information to the ILSS 100. For example, the participants 110 may provide reviews of invention activities instead of, or in addition to, investments. Reviews may include verbal reviews, ratings, rankings, or the like. In some cases, a review is accompanied by an investment, such that the investment expresses a level of confidence in the provided review. Participants may perform other tasks and provide information about such tasks to the ILSS 100, such as providing indications of technical areas that they believe to be fruitful for invention, providing new invention ideas, and the like.

The market manager and analysis engine 113 may also compensate participants based on the outcomes of previously made investments or based upon a computed measure of predicted outcome or some combination of risk, elapsed time, number of investments, or the like. Thus, compensation or other rewards may be levied at times other than when the success of a previously made investment is known. Compensation may take various forms, including by providing an amount of currency to a participant, possibly based on the size of an investment made by the participant and the attendant risk of the associated investment. Compensation may also include increasing/decreasing a participant's reputation, based on reviews or other information received from the participant or from other participants, or from the operators or decision makers of the ILSS 100.

In some embodiments, compensation is based at least in part on whether or not an invention activity was considered to be "successful." For example, the market manager 113 may evaluate various invention activities to determine whether they have been successful or not, which may include, for earlier invention activities whether the ultimate invention is likely to be successful or not. If an invention activity is determined to be successful, then those participants who invested in it may be compensated in some manner along the way (as it progresses through the lifecycle). In this manner, the market manager 113 pays participants out for "bets" they have made particular invention activities, in accordance with the size of the bets and/or potentially the risk of the bets.

In some cases, evaluation of the success of invention activities can use metrics that are based in objective fact. For example, the success of an issued patent may be measured at least in part based on the amount of money for which a particular patent has been licensed, bought, or otherwise transferred. As another example, the success of a particular patent may be measured as an indirect measure of a related, potentially, less valuable patent (say one with a short remaining term) if the licensing of the latter patent will lead to the ultimate licensing of the particular patent or a group of more valuable patents. As another example, the success of a patent application may be measured at least in part on whether or not the patent application issued into a patent. In other cases, typically occurring earlier in the invention lifecycle, the metric of success may be based on opinions or evaluations of other participants, such that an invention activity may be judged as successful if the majority of other participants judge it as successful. For example, an invention disclosure may be considered a "successful" disclosure if the majority of reviewers rated it as a disclosure that was worthwhile pursuing as a patent application, if reviewers on average assigned it higher than some threshold rating, or the like. In other cases, the metric of success of an invention activity, for example occurring earlier in the invention lifecycle, may be measured using statistical analysis tools of the market manager and analysis engine 113 that analyze invention activities and investments in aspects of them across distributions of activities and/or investments.

In yet other cases, the success of a patent application may be measured earlier in the invention lifecycle using ILSS internal processes driven by the operators of the ILSS 100 (or the decision makers 120) or automatically by the ILSS 100. For example, additional compensation events (sometimes referred to as calibration events) may take place when:

Inventors allow their inventions to be reviewed by a broad panel of reviewers, rather than a small panel, and they are rewarded for their "leap of faith";

Persons who review inventions can themselves have their worked judged as good or bad (or on a scale), and the good or better ones are rewarded by the ILSS internal processes;

Submitters can submit prior art references with can be judged as good or bad (or on a scale), and the submitters of the good or better references rewarded by ILSS internal processes;

An internal, unbiased judging panel, which selects high-rated patent activities for moving to the next stage of the invention lifecycle, can reward the inventors and other persons who have invested (or otherwise attached currency) some amount based upon the rating;

A patent activity moves to the next stage since external influencers may have otherwise caused it to be killed off at an earlier time;

A patent application is published by the patent office, on the assumption that the application may have otherwise been failed; and An IP asset is licensed prior to issuance as a patent, and the inventors and/or investors associated with the IP asset are rewarded.

Other calibration/compensation events can be similarly incorporated.

The market manager 113 may also synthesize, aggregate, and/or distill information and/or investments received from participants. For example, the market manager 113 may provide information about the value of multiple investments, such as by providing a list of invention activities ranked in decreasing order of investment, histograms of invention activity investments, topics and/or risk profiles, or other graphs, representations, or the like. A decision maker or other component of the ILSS 100 can then use such a ranked list, statistical profile, or representation to perform a "triage" operation, in which more highly ranked (or important) invention activities are selected for further development. For example, after receiving investments and/or reviews directed to a group of (e.g., 10) patent disclosures, the market manager 113 may provide a ranked list of the patent disclosures, such that the decision maker 120 can select the top disclosures for further development as patent applications.

The ILSS 100 provides guidance information to the decision maker 120. Guidance information can include any information managed, created, stored, generated by the operation of the ILSS 100. The decision maker 120 then makes, based at least in part on the received information, decisions that impact the operation of the invention pipeline managed by the ILSS 100. Guidance information may include, for example, information about invention activities themselves (e.g., the text of an invention disclosure), information about reviews of invention activities (e.g., reviews written by participants about invention disclosures), information about investments in invention activities (e.g., a list of activities ranked by amount of investment), information about the risk involved in investing in one invention activity over others, and the like. The ILSS 100 may generally provide a management, search and discovery interface that can be used by the decision maker 120 or components of the ILSS system itself to oversee and direct the operation of the invention pipeline.

The ILSS 100 may also interact with third-party information sources 155. For example, the ILSS may obtain newsfeeds, analyst reports, or other information about technology trends from the third-party information sources 155. In other embodiments, the third-party information sources 155 may store information used by the ILSS 100, such as patent or patent application publications or file histories (e.g., stored at a patent office). In addition, other third party systems such as banking, trading, fraud detection systems, and the like may be integrated with the ILSS 100.

Figure 2:
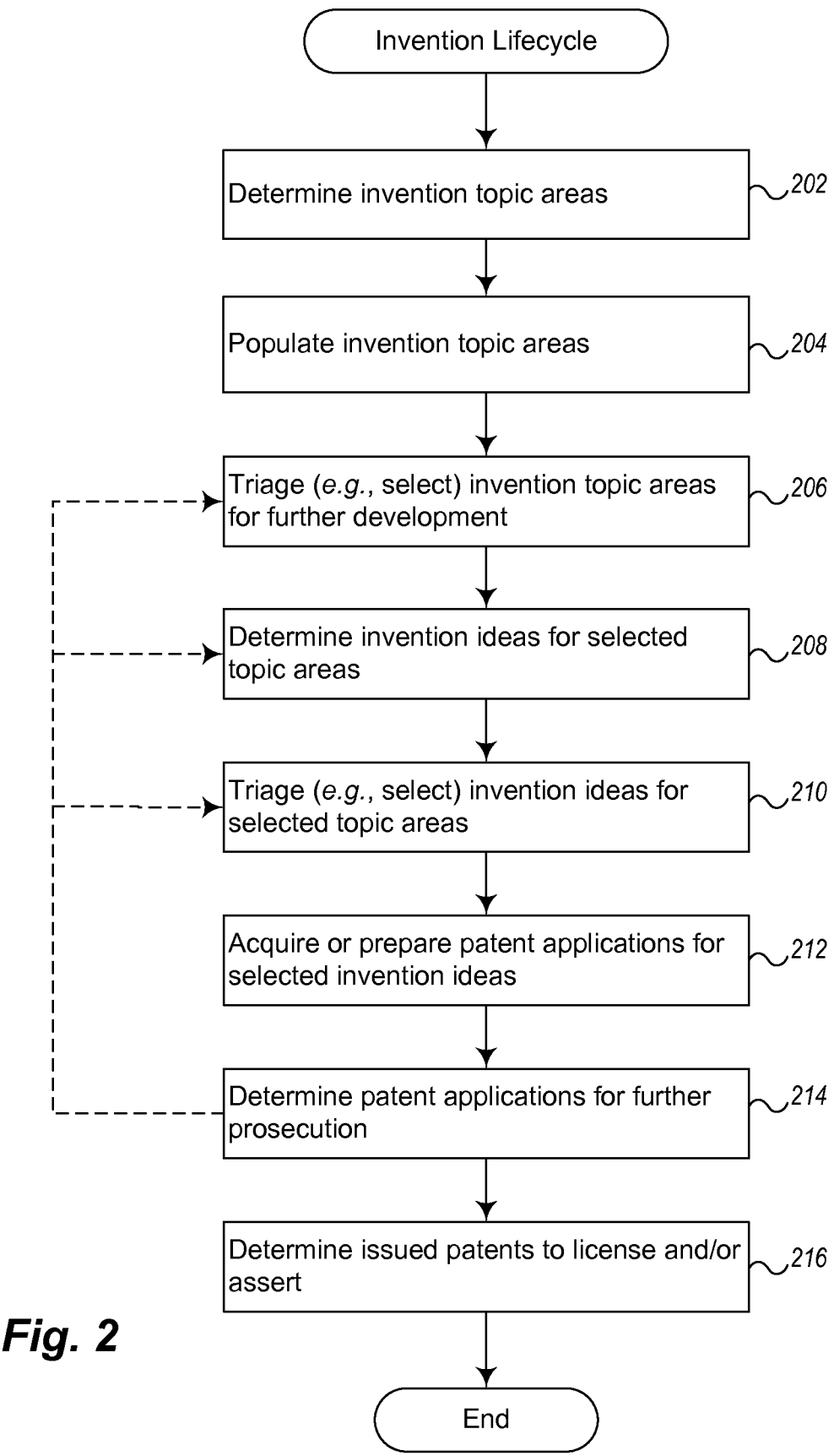
FIG. 2 is an example flow diagram of an example invention lifecycle supported by an example embodiment of an Invention Lifecycle Support System.

FIG. 2 is an example flow diagram of an example invention lifecycle supported by an example embodiment of an Invention Lifecycle Support System. The illustrated lifecycle represents a sequence or collection of phases or stages in an example invention pipeline, beginning with a determination of possible invention topic areas and ending with the exploitation (e.g., commercialization) of intellectual property rights. Each of the phases may loop back to other phrases as different information is determined. The phases may be performed or implemented all or in part by humans, machines, and/or some combination thereof. In one embodiment, the illustrated lifecycle is managed, implemented, and/or represented at least in part by the ILSS, as described herein. Additional phases may be added to the system or some phases may be removed. One purpose of providing each phases is to allow an Invention Network to appeal to a broader population to impart some wisdom from the market regarding inventing—what is important to spend precious resources on and what is not.

The lifecycle begins at block 202, where invention topic areas are determined. Determining invention topic areas may include determining technical areas that are potentially fertile grounds for invention. In some embodiments, technical areas may be identified, based on an analysis of current technological, economic, political, and/or sociological trends, popularity, or developments. For example, based on the rising interest in local food and urban farming, various technical areas related to this social and economic trend may be identified as potentially fertile grounds for invention, such as animal shelter/housing (e.g., mobile chicken coops), food storage/preservation, gardening/agricultural implements, pest control (e.g., to deal with increase in rats/mice due to animal husbandry operations), software (e.g., for managing local food exchanges), and the like.

At block 204, the lifecycle populates invention topic areas. Populating an invention area may include providing a general textual description (e.g., a description of a problem to be solved) or overview of an invention area. In some embodiments, this may include referencing or associating an invention area to an existing schema or taxonomy of technical areas, such as class/subclass hierarchy publicly maintained by a patent office (or other entity) or privately maintained by the operator of the lifecycle.

At block 206, the lifecycle triages (e.g., selects, chooses, determines, and/or formulates) invention topic areas for further development. Triaging invention topic areas may include evaluating whether or not to further develop one or more invention topic areas. Certain topic areas may be selected (or not selected) at this stage based on various factors, including reviews received from participants in an invention network, possibly using some of the market-based approaches described herein.

At block 208, the lifecycle determines invention ideas for selected topic areas. Determining invention ideas may include specifically identifying concepts, approaches, or ideas for an invention in a particular topic area. For example, determining an invention idea for pest control may include providing an outline, abstract, or brief description of a better mousetrap.

At block 210, the lifecycle triages (e.g., selects, chooses, determines, and/or formulates) invention ideas for selected topic areas. Triaging invention ideas may include evaluating whether or not to further develop one or more invention ideas. Certain invention ideas may be selected (or not selected) at this stage based on various factors, including reviews received from participants in an invention network, possibly using some of the market-based approaches described herein. Other information may also be determined at this stage, also possible with the assistance of reviewers or other participants, such as an indication of invention complexity, an indication of one or more sub- or related inventions, an indication of the successfulness of inventions having related schema, or the like.

At block 212, the lifecycle acquires or prepares patent applications for selected invention ideas. Patent applications may be prepared using various known or proprietary techniques. In other cases, previously filed patent applications may also or instead be acquired. Decisions about patent preparation may also be made with the assistance of, or based on, information received from invention network participants, possibly using some of the market-based approaches described herein, such as evaluations (e.g., ratings) of certain patent practitioners, evaluations of for-sale patent applications, or the like.

At block 214, the lifecycle determines (e.g., selects) patent applications for further prosecution. Selecting patent applications for further prosecution may include making decisions regarding actions to take during the prosecution of a patent, such as whether or not to abandon an application, file an appeal, a request for continued prosecution, or the like. Again, such decisions may be made with the assistance of, or based on, information received from invention network participants, possibly using some of the market-based approaches described herein, such as evaluations of the chances of success of an appeal of an examiner's decision.

At block 216, the lifecycle determines (e.g., selects) issued patents to license and/or assert. Selecting patents to license/assert may also be based on information received from invention network participants.

In some embodiments, decisions pending at one triage stage may cause repopulation or reevaluation activities back in an earlier stage of the lifecycle in order to obtain more or better information. For, example, if it is determined that a particular patent application should not be chosen for further prosecution in block 214 based upon sparse information from a person associated with some aspects of the schema for the particular patent application, then the ILSS may choose to request more input, for example, from a different person associated with a different aspect of the relevant schema. This process may be put forth as a "bid" for assistance or more information. This path is represented by the dashed line from block 214 to any of blocks 206, 208, or 210. Other paths to different other phases are also supported.

Figure 3:
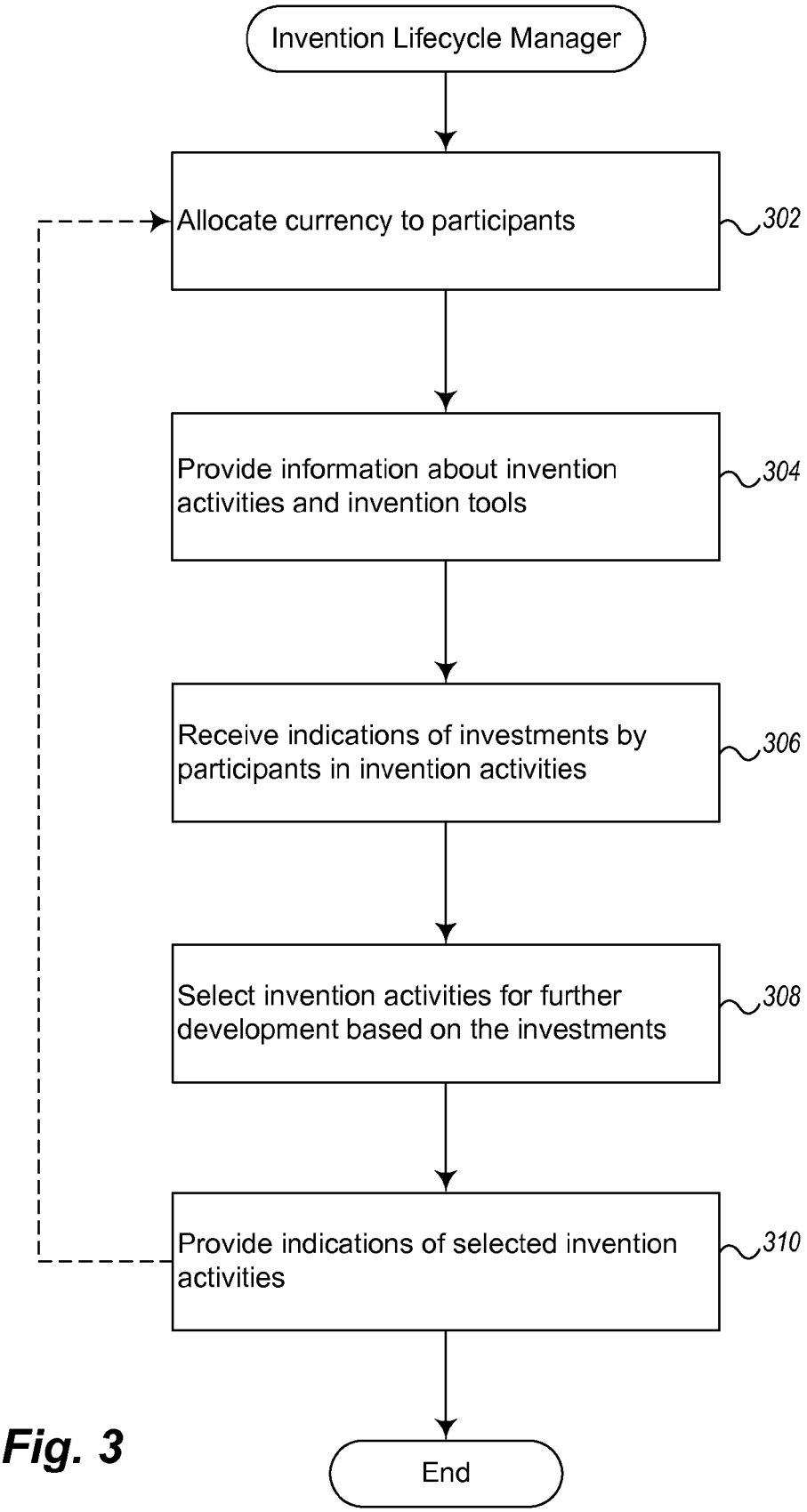
FIG. 3 is example flow diagram of an invention lifecycle management process performed by an example embodiment of an Invention Lifecycle Support System.

FIG. 3 is example flow diagram of an invention lifecycle management process performed by an example embodiment of an Invention Lifecycle Support System. The illustrated process may be performed by one or more components of the ILSS 100, such as the invention lifecycle manager 111, the participant manager 112, and/or the market manager 113.

The process begins at block 302 where it allocates currency to market participants. The allocation may be an initial allocation of currency, such as when a new participant joins the market, or when the market is initially created. In other cases, the allocation may be based on past performance of investments made by participants, the recommendations of others, or prior qualifications of a participant (such as an inventor with many granted patents). Thus, the allocation may be a reward for a previously made "good" or successful investment by a participant. Various metrics may be applied to the determination of successful investments, such as whether a patent application was filed on a particular invention, whether a patent issued, whether a patent was licensed, and the like, as described above. In some cases, the allocation may be negative, of course, such as when a participant has previously made an investment in an invention or other activity that was not successful. Detailed techniques for allocation of currency are described further below.

At block 304, the process provides information about invention activities. Transmitting information about invention activities may include transmitting a request to one or more participants to review and/or provide evaluations regarding an invention activity. For example, such a transmission may include a description of an invention idea and a request that the recipient review the idea and provide a prediction of how likely the invention is to succeed. In some embodiments, such a prediction may be based at least in part on an investment (or real or synthetic currency) that reflects a reviewer's belief that a particular invention or aspect thereof, as represented by a schema associated with the invention, will succeed. Such a prediction may also or instead include a textual evaluation or description (e.g., "this invention is a good one because . . . ") and/or a numeric rating or ranking (e.g., a rating between one and 10, one to five stars, a letter grade).

At block 306, the process receives indications of investments by participants in the invention activities. As noted, a participant can express a belief or prediction that a particular investment will (or will not) succeed by making an investment, where a greater amount of currency reflects a stronger belief in the future success of an invention. The received indications are then recorded, such that participants can be rewarded/compensated for their investments at a later time, such as when the success of the invention is evaluated, as discussed with respect to block 302, above. As explained above, recipients (i.e., participants) may provide predictions, reviews and/or investments in or across only particular aspects of schemas as opposed to the entire invention as a whole. In some embodiments, recipients may hedge or offset (or otherwise have an option to cancel or buy back) their investments.

At block 308, the process selects invention activities for further development based on the indicated investments or investment schemas. Selecting activities may include ordering or ranking one or more activities based on the indicated investments received at block 306. In other embodiments, the top N (e.g., top three) rated activities are selected at this point. In yet other embodiments, the process selects all activities that have a rating higher than some threshold (e.g., an average rating of three out of five stars, an average letter grade better than a C).

At block 310, the process provides indications of selected invention activities. Providing indications of the selected invention activities may include transmitting the indications to human or machine decision makers that determine whether and/or what next steps to take with respect to each invention activity. For example, at block 308, above, multiple activities of the same type (e.g., invention ideas, patent applications) may be ranked (e.g., in non-increasing order) in accordance with the amounts of currency that have been invested in each activity. This ranking can then be used by humans (or machines) to determine which, if any, activities are to be pursued for further development. For example, if the ranked activities are all invention ideas, human or machine decision makers may decide to take the top N ideas and advance them to the patent preparation phase. As another example, if the ranked activities are patent applications that are available for purchase, human or machine decision makers may decide to pursue the top N applications for acquisition.

After block 310, the process may return to block 302 (or some other block) in order to provide a feedback mechanism for investments made by the participants. For example, in returning to block 302, the process may allocate additional currency to participants as a reward for making successful investments. Some of the various types of compensation such as interim rewards prior to invention completion are discussed above with reference to the market manager and analysis engine 113 of FIG. 1. Or, the process may generate feedback reports to participants.

2. Opinion Markets

As can be observed from FIG. 3, the invention lifecycle process as implemented by an example ILSS selects or determines invention activities for further development, i.e., to proceed further along the invention lifecycle, based upon the investments or other factors made at each invention activity level. The investments may be made by participants with an established reputation, those with none, or those somewhere in between. Moreover, investments may be measured or analyzed according to a variety of methods including by schema, time, amount, etc. In some cases the determination of whether an invention activity should proceed to the next phase of the invention lifecycle can be made based upon determinable facts, measurable by the ILSS. In other cases, no hard facts are available to determine the future success of an invention activity at the particular point it is being measured. In this case, "crowd wisdom" is employed as a synthetic representation of truth. The crowd wisdom at times will be wrong, but can be viewed as a cost of doing business for implementing the invention lifecycle process on a large scale. A market that is measured thus by the consensus opinion of the crowd is termed herein an "opinion market" or an "opinion pool."

Fundamental to opinion markets is the value of each participant's opinion. It is possible to derive the same crowd wisdom by asking 3 experts vs. 100 newcomers, as long as the same total expertise is solicited. Opinion markets take into account a participant's expertise or "reputation" and each participant is rewarded (or punished) in a way that influences his or her impact on the next market. Thus, in an opinion market, a reviewer's a priori reputation has "mass," and pulls the consensus toward the reviewer's opinion. This in turn implies that an opinion market has a measurable mass: the running total of reputation among all participants.

A market's mass can also be factored into completion criteria, for example, accepting opinions in a market until such a time as (a) the sum of all reputations reaches a chosen value, and optionally (b) the distribution of opinions reaches a desired confidence level (68%, 95%, 99%, etc.), at which point the opinion market may be considered "complete." At one extreme, a single highly-qualified expert opinion might complete a market. Conversely, if an opinion market reaches a certain mass but lacks a minimum confidence level, it might be considered incomplete, and the ILSS may desire to continue to solicit opinions or terminate the market. In addition, a set of rules for expressing completion criteria may be used to determine whether an opinion market is complete.

Expert opinions pull the consensus in their direction through weighted voting. That is, if newcomers have a reputation multiplier of 1.0 and a more experienced person has a multiplier of 2.0, the experienced person effectively casts two votes to each newcomer's single vote. Every vote changes the market's sample distribution and also changes how complete the market is (e.g., each vote could add to the market's mass but negatively impact the confidence). A person's influence on the consensus value is thus proportionate to their reputation, not to their investment. Or put a different way, an uninformed newcomer with a lot of currency should not be able to unduly influence an opinion market. When such votes are associated with currency, there is a real downside to voting wrong and a real upside to voting right, which potentially incents people to perform additional research and uncover more information before voting. Similar to the way a distributed system operates, even though no one person has all the information, the crowd together has a lot of information that would otherwise be difficult to assemble and therefore available to make a decision.

Figure 4:
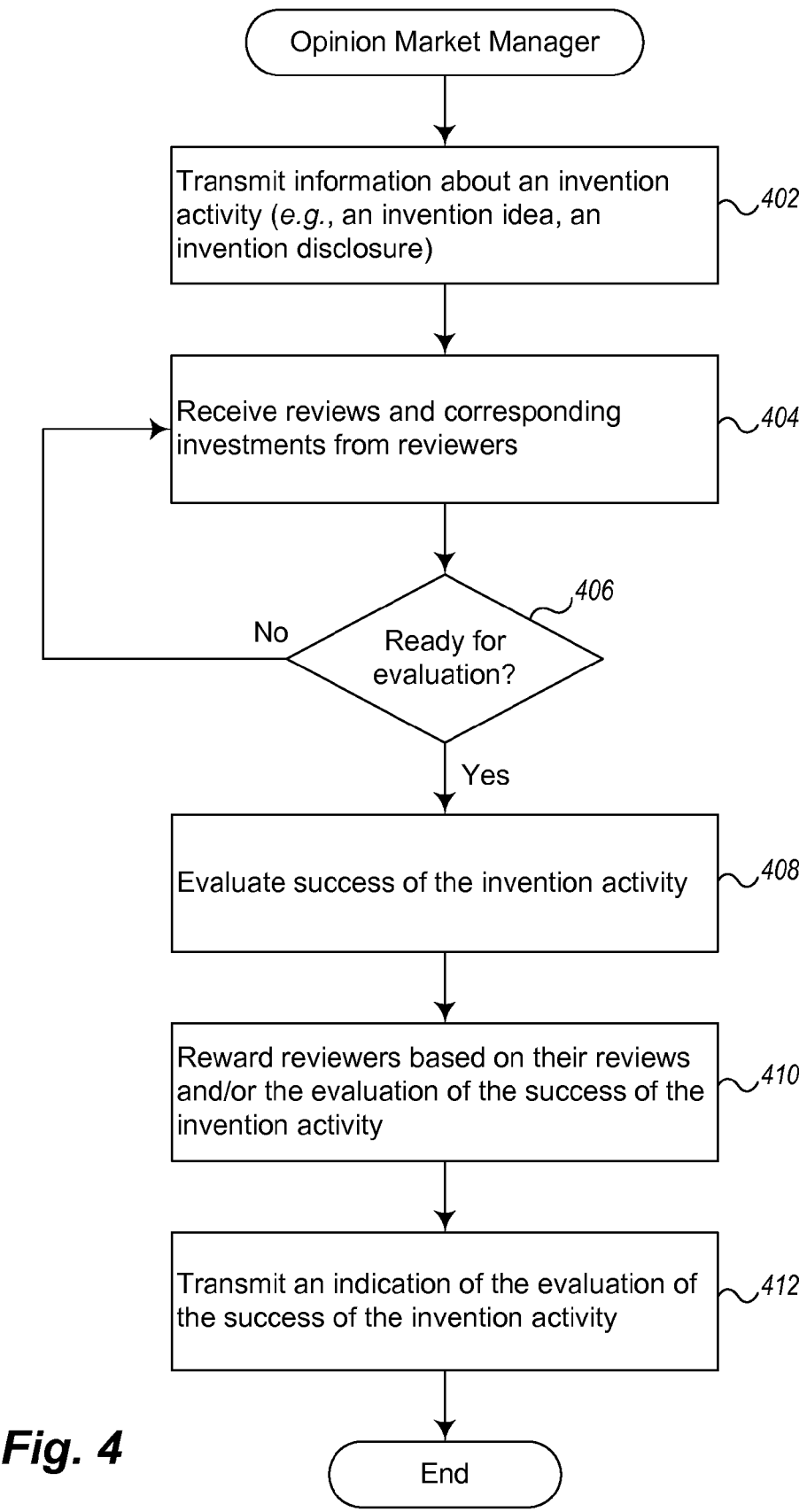
FIG. 4 is example flow diagram of an opinion market management process performed by an example embodiment of an Invention Lifecycle Support System.

FIG. 4 is example flow diagram of an opinion market management process performed by an example embodiment of an Invention Lifecycle Support System. The illustrated process may be performed by one or more components of the ILSS 100, such as the market manager 113.

The process begins at block 402, where it transmits information about an invention activity (e.g., an invention idea, an invention disclosure). Transmitting information may include transmitting a description of an activity taking place during any phase or stage of an invention pipeline. For example, the process may transmit to multiple reviewers an invention disclosure comprising text, drawings, and/or other materials (e.g., audio) describing an invention.

At block 404, the process receives reviews and/or corresponding investments from reviewers. Reviews may be or include a rating or ranking given by the reviewer. In other embodiments, the reviewer may also or instead provide a verbal evaluation, possibly to provide a basis or support for a numeric rating. A reviewer may also provide an investment that expresses a level of confidence, strength of belief, or other indication of a reviewer's belief in the future success of the activity.

At block 406, the process determines whether the invention activity is ready for evaluation. If so, the process proceeds to block 408; otherwise, it returns to block 404 to receive additional reviews and investments. Determining whether an activity is ready for evaluation may be based on various factors, including one or more of whether a sufficient number of evaluations have been received, whether a sufficient mix (e.g., experienced/inexperienced, high/low reputation) of different reviewers have provided reviews, whether reviewers having a sufficient total expertise or reputation have provided reviews, whether the statistical confidence level has reached a desired threshold, or the like. In this manner, the process provides at least some assurance that the market for the activity is sufficiently complete and/or that a consensus opinion has emerged.

At block 408, the process evaluates success of the invention activity. In one embodiment, the success of the invention activity is based on whether the activity is selected for further development, such as when an invention disclosure is selected during a triage process for further development as patent applications. In another embodiment, the success of the invention activity is based on the consensus or average opinion that emerged during the process of review acquisition of blocks 404-406. Thus, a reviewer may be rewarded (at block 410, below) based on how close his review was to the prevailing or consensus review obtained via the above operations.

At block 410, the process rewards reviewers based on their reviews and/or the evaluation of the success of the invention activity. Typically, reviewers are rewarded for being right. Thus, a reviewer who provided a positive review of a successful invention activity will receive a larger reward than a reviewer who provided a negative review of the same activity. Reviewers may also be rewarded based on the size of their investments. Thus, a reviewer who backed a positive review of a successful invention activity with a large investment would obtain a larger reward than a reviewer who backed a positive review of the same activity with a small investment. In addition or instead, reviewers may be rewarded for their work in providing a review, independent of whether the invention activity was determined to be successful. For example, reviewers may be provided an honorarium for performing the work required to provide a review, so as to create an incentive for participation in the market. The reward may be currency, points that can be used within the invention network, or other types of rewards.

For example, in some embodiments participants involved in the review of invention activities may receive points for each participation. The reviewer may bank these points or convert them to cash. In some cases, reviewers may opt to attach banked points to an activity or asset before it is evaluated (triaged or selected) as a means of expressing the participant's confidence in it. The banked points may be used as additional data to the ILSS to determine whether to select the activity or asset and move it along the lifecycle path. The decision (if favorable) can also be used to modify a reviewer's multiplier for future reviews. For example, if a novice reviewer having a multiplier of 1.0 has built up 50 points and decides to attach them to an asset which was in turn accepted during the triage process (for example, block 408 in FIG. 4), then that reviewer moves from having a 1.0 multiplier to a 1.5 multiplier. The multiplier may be increasingly difficult to increase however; a reviewer with an a priori multiplier of 5.0 may not move to 5.5 multiplier from the same 50-point attach. In the case of acceptance during the triage process, the 50 points may also earn the reviewer a bonus; if the bonus is 50% the reviewer's point balance is now 75 rather than 50. On the downside, if the 50 points are attached to an asset which is later rejected at during the triage process, then, in some embodiments, the points are deducted (perhaps at the same % rate rather than as a total loss). Also, a reviewer's multiplier can be decreased based on the decision during the triage process, not just increased. Some embodiments further tie the bonus rate (and the effect on multiplier) proportional to experience level, so that novice reviewers experience smaller gains or losses whereas an experienced reviewer may double confidence points attached to an asset, or lose them entirely. In addition, some embodiments may choose to reward participants that correctly "fail" an activity or asset (e.g., by not attaching points to it, by betting against it, and/or by investing on a negative outcome for it) if that asset ultimately fails to proceed to the next phase of the invention lifecycle as a result of the triage process. Many different combinations can be considered.

At block 412, the process transmits an indication of the evaluation of the success of the invention activity. Transmitting an indication of the evaluation may include providing a report, summary, average, or other aggregation of the reviews gathered by the process, such that a decision maker can utilize the evaluation for triage or other purposes. After block 412, the process may return to block 402 in order to initiate a new opinion market for a different invention activity.

Figure 5B:
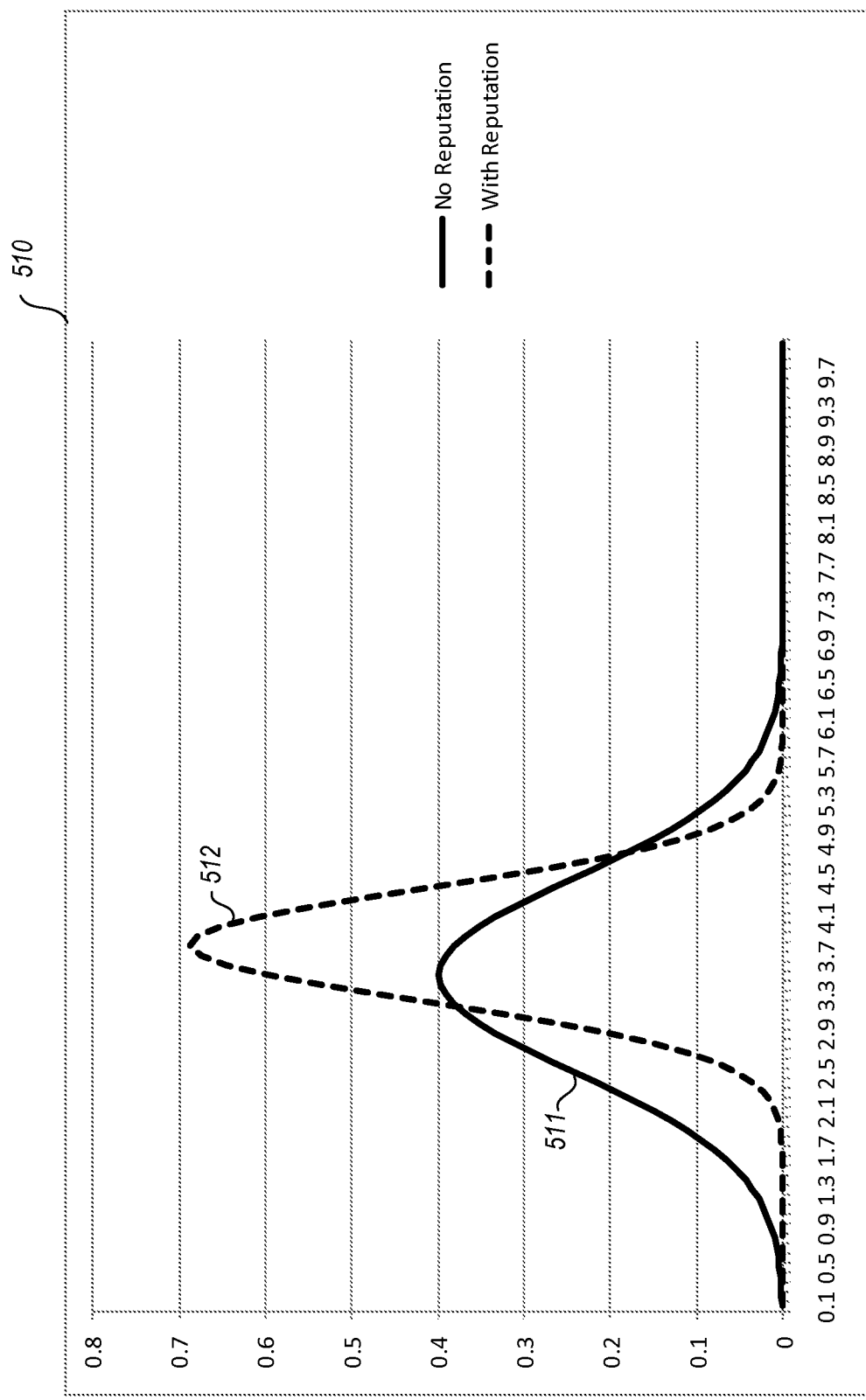

FIGS. 5A-5B illustrate the use of reputation in opinion markets provided by example embodiments. In particular, FIG. 5A depicts two types of opinion markets, 1 and 2. Opinion market 1 does not use reputation and includes four reviewers, A, B, C, and D. In this market, each reviewer has the same impact on the average rating. Thus, if the four reviewers respectively provide reviews of 2, 4, 4, and 4, shown in the boxed vote pool 501, the average rating is 3.5, with a standard deviation of 1.0, which represents a relatively high degree of uncertainty or a low level of confidence.

Opinion market 2 includes the same four reviewers A, B, C, and D, but tracks a reputation for each reviewer. In the illustrated example, reviewers A, B, C, and D respectively have reputations 503 of 10, 13, 10, and 75 (e.g., out of a possible 100). Opinion market 2 multiplies or weights each review by the reputation of the reviewer, such that reviewers with higher reputations have more "votes." Thus, given the same four reviews as in market 1 (2, 4, 4, and 4), market 2 obtains a vote pool 502 that includes 10 reviews of 2 for reviewer A, 13 reviews of 4 for reviewer B, 10 reviews of 4 for reviewer C, and 75 reviews of 4 for reviewer D. These reviews, taken together, yield in an average of 3.8 and a standard deviation of 0.58. Thus, a high reputation reviewer such as reviewer D can have considerable impact on the resulting average review as well as greatly increase the confidence in a resulting rating/review.

FIG. 5B depicts the relative impacts of using (or not using) reputation in an opinion market. In particular, FIG. 5B illustrates a graph 510 that plots two normal distributions 511 and 512 based respectively on the averages and standard deviations of opinion markets 1 (no reputation) and 2 (with reputation), discussed above. The distribution 512 has a substantially sharper peak than distribution 511, illustrating the relatively higher degree of confidence in the result obtained due to the consideration of reputation in the corresponding opinion market.

Opinion markets not only generate collective wisdom on a per-asset basis but allow use of one in a system such as an ILSS to reward consistent performers by increasing their reputation value. Reputation can be integrated into the ILSS as a means of system self-calibration; those with a high reputation can be considered a 'control group' (in the experimental design sense of the word), so that the reputation of a participant of low or unknown reputation is enhanced when their answer closely aligns with a person of high reputation (the control group) and/or with the consensus opinion of a market. If that same lower reputation participant continues to offer opinions (make investments) near consensus points, they will eventually become a high reputation participant.

In some embodiments, invention activities or assets may be associated with varying "pedigree." In some embodiments, the ILSS will match the reputation of the author (if applicable, as with a patent topic description) with the average (or minimum) reputation of the reviewing audience. For example lower pedigree invention activities or assets may be put into "beginner" opinion markets which only permit participation by users below a certain reputation value, and vice versa. This allows more sensitive assets to be reviewed by participants of a known reputation or ones with which the ILSS has a more secure relationship. Also, different pedigree markets allows the "ramp up" of a market to insure that it doesn't close before newcomers have been given a chance to contribute. Preventing participants with more participation history from jumping on a market right away also can function as a way to discourage aberrant behavior.

When used for asset review, such as to review topic or idea disclosures or descriptions, one can configure a corresponding opinion market with a fixed total payout (a bounty) to prevent participants from attaching a balance of their network currency to an answer to obtain an uncharacteristic reward. Opinion markets operated in this fashion thus function as a "work for hire" where the bounty is distributed pari-mutuel style (or by some other distribution equation) among the participants. Payout may be complex because, as opposed to non-opinion based markets, there are no hard boundaries between winning and losing answers, just "more right" and "less right." Reward "bands" may be computed to liquidate the market: for example, all persons within ½ standard deviation share in 45% of the full bounty, then those within 1 standard deviation split 35% of the bounty, etc., with possibly no reward for those outside of 2 standard deviations. Using such a system those quite close to the consensus are effectively rewarded multiple times since they are inside concentric reward bands. As an alternative, rather than configure bands according to standard deviation, the bands may be calculated as top 10 percent, top 50, etc. In this case, a participant's reputation multiplier gives them a higher payout than a newcomer who answered exactly the same, creating an incentive to rise through the reputation ranks, as well as to keep those of high reputation contributing.

To discourage participants from randomly participating in all markets as a means of "gaming" the system, it may be necessary to force a net loss over time to poor or random performers so that they eventually fire themselves. There is a also recognized danger of collusion if participants understand that deliberate herd mentality can be a rewarding strategy. Under prediction market scoring rules where there is a right or wrong answer, highly popular outcomes may become prohibitively expensive to buy. With opinion markets, however, one does not want to discourage popular outcomes as this is the opposite of what is desired, where, in the ideal case participants, tightly converge on a consensus opinion but do so without conspiring. Again, to the degree the number of experienced participants in any one market can be limited, the effect of collusion can be mitigated. Presumably the ILSS can detect when a collection of participants frequently appears in the same markets, in the same general percentile and subsequently prohibit participation. Other techniques for limiting undesirable behavior may also be incorporated.

Other variations of opinion market aspects may also be incorporated. For example, reputation may be increased in other manners such as through paid work and/or predictions. As another example, work for hire (paid work) may be used to increase a participant's reputation but the opinion market results may be used to increase or reduce it, in potentially larger multiples. In yet other examples, rewards may be distributed for turning in aberrant participants, a certain amount of work for free (pro bono work) required, etc.

3. User Interface Aspects of One Embodiment

Figure 6C:
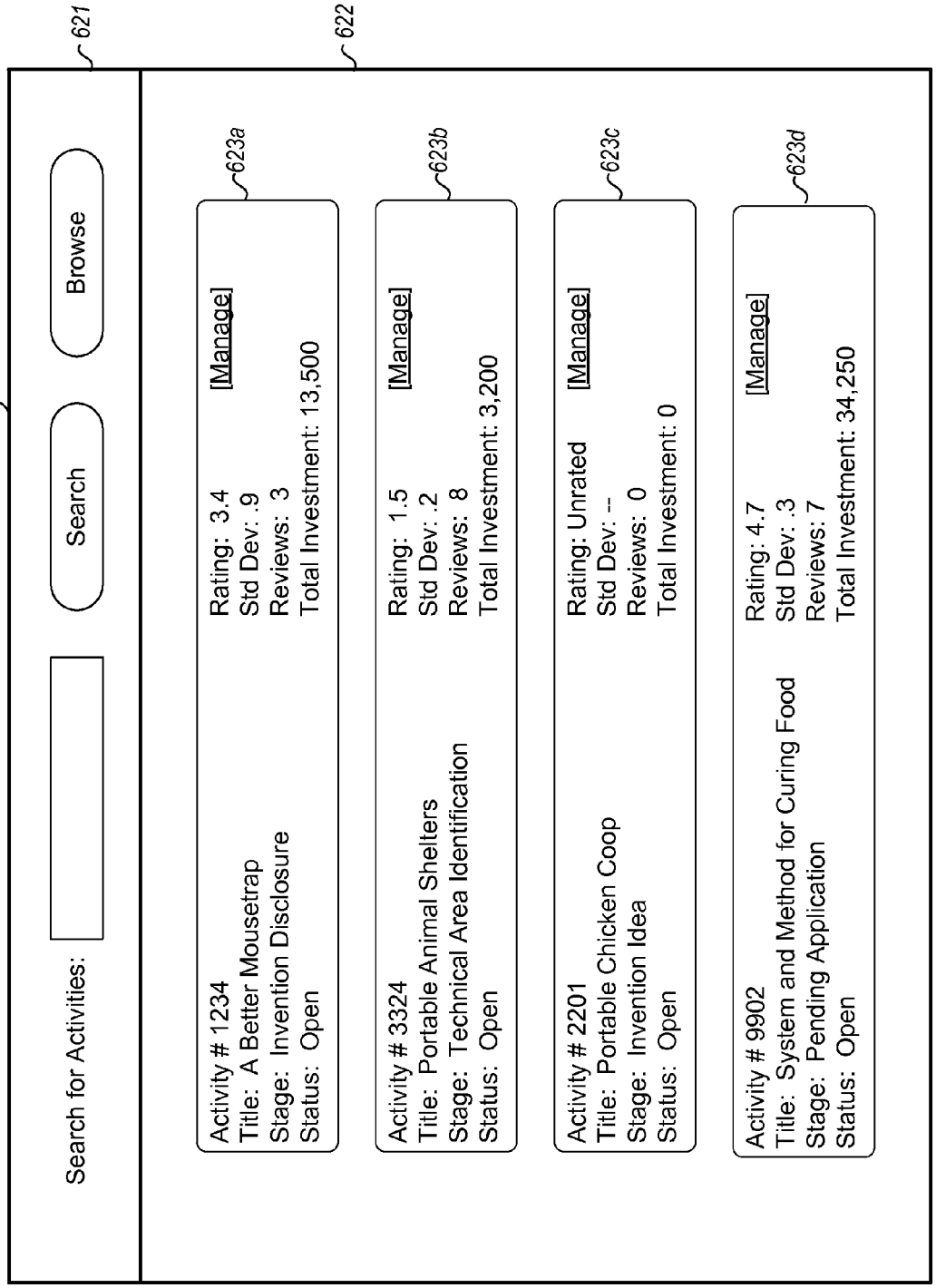

FIGS. 6A-6C illustrate example screen displays provided by an example embodiment of an Invention Lifecycle Support System. More specifically, FIGS. 6A and 6B illustrate a participant dashboard screen, while FIG. 6C illustrates an administrator or decision maker dashboard screen, as described below. Different user interfaces can be otherwise incorporated.

FIG. 6A depicts a participant dashboard screen 600 that can be used by a reviewer to obtain information about invention activities to review or other tasks to be performed in the ILSS. The screen 600 includes a navigation area 601 and an activity information area 602. The navigation area 601 includes controls that, when operated by the reviewer, can be used to search or browse for invention activities. Invention activities may be searched in various ways, including by specifying keywords or other criteria (e.g., invention category or class, activity type, age/date). Invention activities can also be browsed in various ways, including by category/class, title, inventor name, date, and the like.

The activity information area 602 is populated in response to a search or browse action performed in the navigation area 601. In this example, the reviewer has searched for the keywords "urban farming" and has received invention activity information items 603a-603d. Each information item 603a-603d provides a summary of a corresponding invention activity, by providing an activity identifier (e.g., 1234), a title (e.g., A Better Mousetrap), an invention stage (e.g., Invention Disclosure), and a status (e.g., Open). An invention activity may be considered open if the ILSS is still accepting reviews or investments in the activity. An activity may be considered closed after the activity has been advanced or developed to a subsequent activity (e.g., an invention disclosure has been selected for patent application preparation), after the activity has been triaged out of the lifecycle (e.g., not selected for further development), or other like conditions. Each information item 603a-603d also includes controls (e.g., links) for obtaining more information (e.g., See More) and for submitting a review (e.g., Review).

FIG. 6B depicts the participant dashboard screen 600, configured for use by the reviewer to provide a review and/or make an investment in a particular invention activity. In FIG. 6B, the reviewer has selected the Review control for item 603a (FIG. 6A), and in response, the screen 600 has been updated to present a review panel 610. The review panel 610 includes controls that provide additional details about a corresponding invention activity and that enable the reviewer to provide a review for the activity. In particular, the panel 610 includes an activity summary area 611, an activity details area 612, and a review area 613. The summary area 611 provides information similar to that described with respect to an activity information item 603a-603d, above. The details area 612 provides additional information, in this case a textual description of the invention. The information in the details area 612 will depend on the activity type. For example, if the activity is a patent application, then the details area 612 may include or reference the patent application as well as possibly the prosecution history and other related documents.

The review area 613 includes instructions to the reviewer that the reviewer provide a written review, a rating, and an investment. The instructions also inform the reviewer that they will receive an honorarium for providing the review, as well as possibly some return on his investment. After providing the requested information, the reviewer can select the Submit control to transmit the review to the ILSS.

FIG. 6C depicts an administrator dashboard screen 620 that can be used by a decision maker or other administrative user to obtain information about invention activities managed by the ILSS. The screen 620 includes a navigation area 621 and an activity information area 622. The navigation area 621 is similar to the navigation area 601 described with respect to FIG. 6A, although the user here may be able to search on information that is not available to ordinary participants. The information area 622 is similar to the information area 602 described with respect to FIG. 6A, although again the user here may be able to obtain information about activities that is not available to ordinary participants. For example, each activity information item 623a-623d includes information about reviews and investments, such as the average rating, standard deviation, number of reviews, and total investments. In some cases, such information would ordinarily not be made available to reviewers, in order to encourage reviewers to make their own decisions and to prevent reviewers from operating in a "herd-like" manner (e.g., following experienced reviewers, or making investments simply based on the fact that others have made the same investment). Each activity information item 623a-623d also includes a Manage control that allows the user to modify the state of the activity, such as by opening/closing it for review, advancing it to the next stage in the pipeline, and the like.

In the following, various other user or user-interface aspects provided by some embodiments of the ILSS and/or the Invention Network are described. For example, an Invention Network provided by an example ILSS typically includes some more general features such as ones relating to membership management, signing up, etc. In addition, the Invention Network supports features directed specifically towards invention and invention disclosure.

In some embodiments, there are portions of the site which people can approach relatively casually and there are portions of the site which require very, very strict non-disclosure agreements (NDAs) in order to be a part of, to prevent information from leaking outside the Network. So, at any given point, a person may be viewing at least two levels of the Network and possibly more.

In one level of the network, the confidential level, participants are trusted to look at the details of an invention up to and including submitting the invention itself and ranking and rating the disclosure, the invention, the patent application, and so on. People allowed to view this level will have a tremendous amount of information at a potentially early phase in the invention lifecycle, which would allow them in theory to damage the invention, for example, possibly file in another country, or do other kinds of things that are not desirable. Therefore, the people allowed access to this level are typically "partner level" people who are sufficiently trusted.

Some embodiments will secure the identity of people participating in a level in order to achieve varying degrees of authentication and/or anonymity. Some participants will actually be under contract, which may vary depending on what country they come from, in terms of where that contract is actually held. But, whoever holds that contract is in themselves entrusted to the Invention Network, because they could be a remote affiliate or even a company that is independent from the company offering the Invention Network. It may be desirable to verify any contracts with the outside company in order to put them in good standing before allowing them to participate in the Invention Network. In some embodiments, there may be the ability to include them in an "uncertain" standing, at which point they no longer have access to the information.

Furthermore, in some embodiments, it may be desirable for the ILSS to determine, any given point in time, who are the people who had access to particular information, so that the ILSS can either forensically or prospectively determine who was able to see something. Some embodiments watermark or stenographically alter the information that is being passed to different members, so that the ILSS can actually determine if it has been forged electronically and where it came from.

Casual access users may be defined who can look at specific attributes of things like topics, etc., either because the topic or disclosures or information have been marked or specified as being less sensitive, that the information is allowed to be more open, including open contests, etc., or because of the nature of the activity that they are doing, for example ranking the likelihood of a technological outcome or market outcome that is not as private. In such instances, the ILSS may provide a portion of the system that is more open to allow more people to participate with less confidentiality requirements. In some cases, varying degrees of anonymity are allowed, including completely anonymous participation.

In some embodiments the ILSS offers a "click-to" interface for invention disclosures. A "one click license" is presented where someone can click to license to participate in a variety of invention related activities by clicking through to a non-disclosure agreement (an NDA). Even casual users may be under some level of liability to the operators of the Invention Network to keep the information within the Network. In addition, the click-to interface includes the general terms and conditions seen in social networks about behavior and not causing people to engage in inappropriate behavior, etc.

At different points in the invention lifecycle, information is either more open or more closed. For example, once the information is in the form of an application for a patent or ideas and an application for a patent, conditions may change. Also, once the patent application is published there is a lot of information that is made publically available, and once it is issued there is even more information made publically available. At that point, a lot of later stages of the pipeline, for example, stages relating to license ability and continuing to look at what opportunities exist on for a particular patent, may be much clearer and more open.

Note that when a patent issues, under the Invention Network, the invention has had between one and four years of people investing or otherwise participating in it depending on if it is a "fast track" patent or not. It may be a fast track patent either because it is defined so in the ILSS or because it has been filed, for example, under the Accelerated Examination program in the patent office. Such a patent immediately emerges with a set of people who have a stake in it, which can attract even more people to either put a stake into it or not. Thus, at issuance there is a lot more default information that the patent starts off with other than just opinions. In some ways it similar to an initial product offering (an IPO). Before issuance, the invention is like a private equity venture capital type of project: not everyone can invest, people who do often are under NDA, and they are kind of close to the company. Then when the invention issues as a patent (becomes an IPO), it is suddenly public and everyone can invest in it.

There are behaviors in the network that may be controlled and encouraged or discouraged, for example, relating to salaries and payments. The Invention Network may reward participants in at least two manners: it can associate real salaries or payments to successful outcomes, where people are paid in a currency such as their local currency, and it can pay in virtual currency or points, or in some combination of the two, perhaps driven by behaviors that the Invention Network wants to encourage. For example, if somebody has signed up to be a person who triages technical licenses in a given area (a license triage person), then it is expected to see a flow of information, a work list of things to do, and an indication of the person's bets. If the license triage person does not do these things, then he or she should not get paid. Over time the license triage person's membership may or may not be reviewed by the decision makers or administrators of the Invention Network.

In some embodiments, the Network offers a variety of tools relating to the development of internal expertise which operate similar to a bulletin board system. For example, a lot of support sites include bulletin boards where somebody asks a question, some number of people come up with an answer, and then the person who asked the question gets to decide who gave the answer that was really the most useful. In some such systems, the persons with the answers that are chosen get their reputations enhanced, and some of them get paid as a result. The Invention Network could also employ such a system to allow a secondary phase involving other people as decision makers. The persons with the best answers would eventually emerge as experts, because there will be likely a lot of questions. For example, when a topic is generated by an ILSS, people will ask for elaboration on the topic and ask one or more questions regarding the topic. The Invention Network may have internal staff answering questions, for example the people designated to "own" that topic. But, over time other people outside the Invention Network may opt to own it, become co-owners of that the topic, start researching the topic, getting very interested in it and then start to answer questions on their own. In some embodiments of the Invention Network this behavior is encouraged to distribute the "intelligence load" on the system. In the end there may be a very large amount of content and certain areas that are contributed by support personnel not employed by the company or entities that own or deploy the Invention Network. Such outside expertise is useful to reduce the amount of support the deployment company needs to give to the Invention Network, and the Invention Network can become self supporting. Over time, people can be rewarded who are doing a good job handholding other members for the Invention Network. The rewards can be realized by combinations of real dollars, virtual currency, and, for example, medals or awards, activity incentives, and the like.

A variety of techniques can also be used to provide anti "pile-on" techniques or anti-dilution, or other ways to reduce over-capitalization of an invention investment. For example, another way to encourage or discourage participation in an invention activity is to put a decaying timeline on some work task. Using the example of triaging technical licenses above, the ILSS could indicate that if the participant does this review within the first a couple of weeks, the participant gets the full expected benefit of doing so, 50 units of virtual currency or whatever, and then the profits start to decay until three months later, when the participant will receive zero compensation.

Timing control also may be important because it has been observed that one of the problems with doing triage of invention activities is that substantially all of the disclosures and ideas come in at the deadline date. If essentially everything comes in at the deadline date, a huge peak load is created. Therefore, if there are incentives for participants to submit them early, then it may be possible to smooth out the activities over a longer time period. Also, making an invention activity available early to the Invention Network allows more people to invest and contribute to it.

Other ways to encourage or discourage investment and/or to prevent over-capitalization include mechanisms such as to create staged entry or queued investments where only participants occupying the first "n" slots are allowed to invest. The participants in slots subsequent to "n" move up in position as these other participants decline to invest, or are ousted due to time or other constraints. Additional techniques include penalizing late participants, defining participant (like investment) rounds, etc.

In some embodiments of the Invention Network there is an exclusive referral network that allows a social networking type of view to help to people to understand what it takes to invest. In addition, if there is a participant who has a lot of currency invested in an area (e.g., along some aspect of a schema), this person can use the referral network to see whether what he has "predicted" or otherwise bet on is coming to fruition. For example, they can contact people to let them know that there is a lot of investment of currency going into a particular area, and since they are in that area, perhaps they are interested in participating, or getting connected.

There are an additional number of features that can be included as further user interface features in the Invention Network. Participants may want to have a subscription based system to the investments that they hold, so that they can view and track their investments, and see what people are doing with them. Several online finance programs, for example, Yahoo finance, provide a set of equity price charts, which may be useful to visualize what is going on with invention investments. An Invention Network user can build a portfolio of invention investments and then have a blended portfolio chart to keep track of progress. For example, a participant could look at a probability sheet distribution type of chart to tracks where the bets/predictions are going—which direction a particular bet is heading. A lot of very rich third party graphical and/or analytical tools can be incorporated into the Invention Network and thus offered to the investors. Or, the Invention Network can offer more efficient tools to simply output the data in a way that existing tools can consume and display for the participants.

4. Example Computing System Implementation

Figure 7:
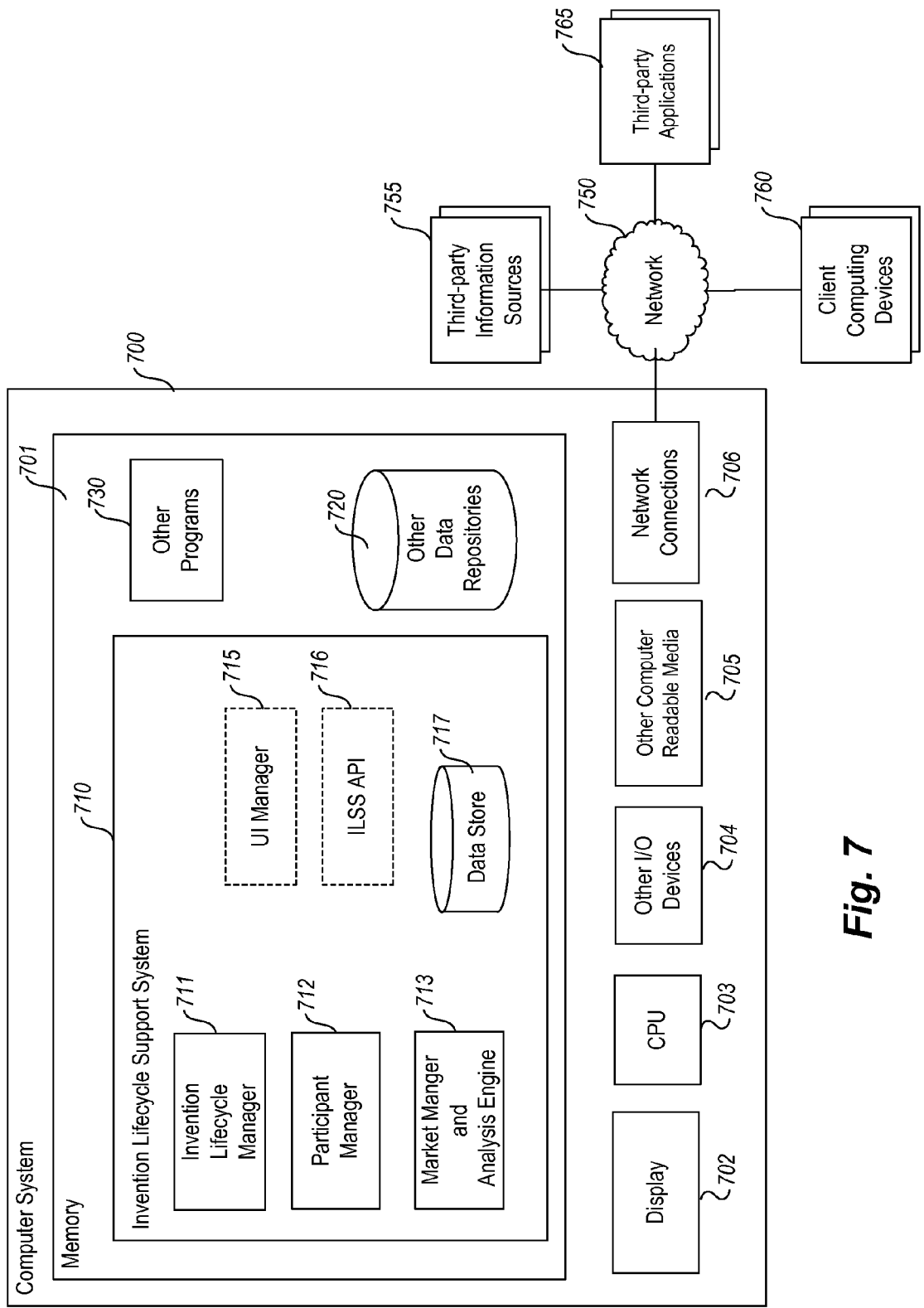
FIG. 7 is an example block diagram of an example computing system for implementing an Invention Lifecycle Support System according to an example embodiment.

FIG. 7 is an example block diagram of an example computing system for implementing an Invention Lifecycle Support System according to an example embodiment. In particular, FIG. 7 shows a computing system 700 that may be utilized to implement an Invention Lifecycle Support System ("ILSS") 710.

Note that one or more general purpose or special purpose computing systems/devices may be used to implement the ILSS 710. In addition, the computing system 700 may comprise one or more distinct computing systems/devices and may span distributed locations. Furthermore, each block shown may represent one or more such blocks as appropriate to a specific embodiment or may be combined with other blocks. Also, the ILSS 710 may be implemented in software, hardware, firmware, or in some combination to achieve the capabilities described herein.

In the embodiment shown, computing system 700 comprises a computer memory ("memory") 701, a display 702, one or more Central Processing Units ("CPU") 703, Input/Output devices 704 (e.g., keyboard, mouse, CRT or LCD display, and the like), other computer-readable media 705, and network connections 706. The ILSS 710 is shown residing in memory 701. In other embodiments, some portion of the contents, some or all of the components of the ILSS 710 may be stored on and/or transmitted over the other computer-readable media 705. The components of the ILSS 710 preferably execute on one or more CPUs 703 and recommend activities based on mobile device context, as described herein. Other code or programs 730 (e.g., an administrative interface, a Web server, and the like) and potentially other data repositories, such as data repository 720, also reside in the memory 701, and preferably execute on one or more CPUs 703. Of note, one or more of the components in FIG. 7 may not be present in any specific implementation. For example, some embodiments may not provide other computer readable media 705 or a display 702.

The ILSS 710 interacts via the network 750 with third-party information sources 755, third-party applications 765, and client computing devices 760. The network 750 may be any combination of media (e.g., twisted pair, coaxial, fiber optic, radio frequency), hardware (e.g., routers, switches, repeaters, transceivers), and protocols (e.g., TCP/IP, UDP, Ethernet, Wi-Fi, WiMAX) that facilitate communication between remotely situated humans and/or devices. The client computing devices 760 include desktop computers, notebook computers, mobile phones, smart phones, personal digital assistants, and the like. The client computing devices 760 may be used by participants and/or decision makers, such as those described with respect to FIG. 1, to interact with the ILSS 710.

In a typical embodiment, the ILSS 710 includes an invention lifecycle manager 711, a participant manager 712, a market manager and analysis engine 713, an optional user interface manager 715, an optional ILSS application program interface ("API") 716, and one or more data stores 717. The modules 711-713 respectively perform functions such as those described with reference to modules 111-113 of FIG. 1.

The UI manager 715 provides a view and a controller that facilitate user interaction with the ILSS 710 and its various components. For example, the UI manager 715 may provide interactive access to the ILSS 710, such that decision makers can obtain information about invention activities and/or participants can provide reviews, investments, or perform other requested tasks. In some embodiments, access to the functionality of the UI manager 715 may be provided via a Web server, possibly executing as one of the other programs 730. In such embodiments, a user operating a Web browser executing on one of the client devices 760 can interact with the ILSS 710 via the UI manager 715. For example, a participant user may search for invention disclosures to review and/or fill out a Web form to provide a review of an invention disclosure.

The API 716 provides programmatic access to one or more functions of the ILSS 710. For example, the API 716 may provide a programmatic interface to one or more functions of the ILSS 710 that may be invoked by one of the other programs 730 or some other module. In this manner, the API 716 facilitates the development of third-party software, such as user interfaces, plug-ins, news feeds, adapters (e.g., for integrating functions of the ILSS 710 into Web applications), and the like.

In addition, the API 716 may be in at least some embodiments invoked or otherwise accessed via remote entities, such as code executing on one of the client devices 760 or as part of one of the third-party applications 765, to access various functions of the ILSS 710. For example, an application on a mobile device may obtain or provide information about invention activities via the API 716. As another example, one of the third-party information 755 may push information about trends (e.g., a newsfeed) into the ILSS 710 via the API 716. The API 716 may also be configured to provide widgets (e.g., code modules) that can be integrated into the third-party applications 765 and that are configured to interact with the ILSS 710 to make at least some of the described functionality available within the context of other applications.

The data store 717 is used by the other modules of the ILSS 710 to store and/or communicate information. In particular, modules 711-716 may use the data store 717 to record various types of information, including information about participants, markets, inventions, invention topic areas, and the like. Although the modules 711-716 are described as communicating primarily through the data store 717, other communication mechanisms are contemplated, including message passing, function calls, pipes, sockets, shared memory, and the like.

In an example embodiment, components/modules of the ILSS 710 are implemented using standard programming techniques. For example, the ILSS 710 may be implemented as a "native" executable running on the CPU 703, along with one or more static or dynamic libraries. In other embodiments, the ILSS 710 may be implemented as instructions processed by a virtual machine that executes as one of the other programs 730. In general, a range of programming languages known in the art may be employed for implementing such example embodiments, including representative implementations of various programming language paradigms, including but not limited to, object-oriented (e.g., Java, C++, C#, Visual Basic.NET, Smalltalk, and the like), functional (e.g., ML, Lisp, Scheme, and the like), procedural (e.g., C, Pascal, Ada, Modula, and the like), scripting (e.g., Perl, Ruby, Python, JavaScript, VBScript, and the like), and declarative (e.g., SQL, Prolog, and the like).

The embodiments described above may also use either well-known or proprietary synchronous or asynchronous client-server computing techniques. Also, the various components may be implemented using more monolithic programming techniques, for example, as an executable running on a single CPU computer system, or alternatively decomposed using a variety of structuring techniques known in the art, including but not limited to, multiprogramming, multithreading, client-server, or peer-to-peer, running on one or more computer systems each having one or more CPUs. Some embodiments may execute concurrently and asynchronously, and communicate using message passing techniques. Equivalent synchronous embodiments are also supported. Also, other functions could be implemented and/or performed by each component/module, and in different orders, and by different components/modules, yet still achieve the described functions.

In addition, programming interfaces to the data stored as part of the ILSS 710, such as in the data store 717, can be available by standard mechanisms such as through C, C++, C#, and Java APIs; libraries for accessing files, databases, or other data repositories; through scripting languages such as XML; or through Web servers, FTP servers, or other types of servers providing access to stored data. The data store 717 may be implemented as one or more database systems, file systems, or any other technique for storing such information, or any combination of the above, including implementations using distributed computing techniques.

Different configurations and locations of programs and data are contemplated for use with techniques of described herein. A variety of distributed computing techniques are appropriate for implementing the components of the illustrated embodiments in a distributed manner including but not limited to TCP/IP sockets, RPC, RMI, HTTP, Web Services (XML-RPC, JAX-RPC, SOAP, and the like). Other variations are possible. Also, other functionality could be provided by each component/module, or existing functionality could be distributed amongst the components/modules in different ways, yet still achieve the functions described herein. For example, one or more of the components of the ILSS 710 may be provided by or integrated with third party applications or functionality, such as that provided, for example, by financial enterprises, trading institutions, entities that provide fraud detection, and the like.

Furthermore, in some embodiments, some or all of the components of the ILSS 710 may be implemented or provided in other manners, such as at least partially in firmware and/or hardware, including, but not limited to one or more application-specific integrated circuits ("ASICs"), standard integrated circuits, controllers executing appropriate instructions, and including microcontrollers and/or embedded controllers, field-programmable gate arrays ("FPGAs"), complex programmable logic devices ("CPLDs"), and the like. Some or all of the system components and/or data structures may also be stored as contents (e.g., as executable or other machine-readable software instructions or structured data) on a computer-readable medium (e.g., as a hard disk; a memory; a computer network or cellular wireless network or other data transmission medium; or a portable media article to be read by an appropriate drive or via an appropriate connection, such as a DVD or flash memory device) so as to enable or configure the computer-readable medium and/or one or more associated computing systems or devices to execute or otherwise use or provide the contents to perform at least some of the described techniques. Some or all of the system components and data structures may also be stored as data signals (e.g., by being encoded as part of a carrier wave or included as part of an analog or digital propagated signal) on a variety of computer-readable transmission mediums, which are then transmitted, including across wireless-based and wired/cable-based mediums, and may take a variety of forms (e.g., as part of a single or multiplexed analog signal, or as multiple discrete digital packets or frames). Such computer program products may also take other forms in other embodiments. Accordingly, embodiments of this disclosure may be practiced with other computer system configurations.

5. Additional Aspects of Various Embodiments

In the following description, additional aspects and example details of various embodiments that may be included in an example ILSS or Invention Network supported by an ILSS are described or further described.

The structured approach to inventing using an Invention Network, such as that provided by an ILSS, creates something beyond "reputons" and prediction markets in that it comprises both (1) a defined process and (2) a set of schema along which people can make bets/investments. A "reputon" is a concept that defines a currency and market-based approach to determine a person's reputation, social standing, or level of trust in a network, for example a social network. In the network, there are people potentially unknown to each other and there are people who are known to each other. Reputons attempt to avoid the case, as in many social networks, where people who are known to the largest number of other people gain all the power in the network based on straight voting rights. In such systems, voting becomes a popularity contest rather than a meritocracy. With the use of reputons, by allowing investment in people's reputations, it is possible to use an economic metric to reduce the likelihood of feeding a popularity contest and to instead produce more of a meritocracy.

Specifically, according to the reputon concept, people invest their popularity, or their reputation, in other people who do not have a strong reputation and therefore, over time, in an equilibrium situation, the people who don't have a strong reputation potentially gain a greater reputation and the people already with a strong reputation potentially gain more reputation by backing others. This is similar to Angel Venture Capitalists ("VCs"). Somebody who has been a successful VC can invest in aspiring VCs. The notion being that a VC who is already successful can pick criteria to help a not yet proven VC to successfully invest better than random people.

The structured approach to inventing using an Invention Network, such as that provided by an ILSS, incorporates the notion of a "schema" to enhance the ability to vote or invest along multiple dimensions including in others' reputations as they relate to invention activity. As explained above, the multi-dimensional schema allows participants to participate in an invention activity, for example, invest in an asset, trend prediction, topic, etc., based upon subcategories of the activities, to allocate risk on a smaller defined level, or to invest in other people with strong reputations along any particular aspect of the schema, thus allowing investment across multiple dimensions. Thus, the schema provides not a unitary vote or unitary bet like a prediction market, but rather a kind of a multi variable bet. People therefore can accrue expertise or reputations in these different areas of criteria (across different inventions) as well as in the inventions as a whole.

For example, many inventors may be very good at predicting, the likelihood that semi-conductor technology will actually come to pass, but may actually be very poor at determining whether marketing plans are likely to succeed or not, or may be poor at predicting what capital markets will appear to fund different types of technology. There may be people who are very expert in a particular geography, like what China is likely to adopt, because they understand the social and physiological make-up of that population, but may not understand the United States market at all.

So the criteria embodied by these schema allow operators of the Invention Network (the proponents, recipients, administrators, facilitators, and/or moderators of the Invention Network) to develop "multi-dimensional pictures" of expertise and allow participants to focus their expertise in a given area. Thus, unlike a prediction market which is, strictly speaking very unitary and combines a large number of unknown criteria into someone's bet, the Invention Network deliberately partitions the criteria according to a schema that is developed potentially even over time and then tracks the bets made by participants according to those schema.

In one embodiment, although there are multi-variable schema, the currency used may be universal. There may be a virtual currency that can be used to bet or invest across any number of these schemas. So, for example, if a participant has a million virtual currency units, he could bet/invest 10,000 of them on a prediction of the likelihood that a technology will be adopted and he could also bet/invest 20,000 units on the prediction of whether a market will develop. Thus, it is up to the participant to focus his currency, based upon his expertise, in areas he believes are likely to get a return. Alternatively, the participant could put a smaller amount of currency on a less probable bet/investment that would have a higher return in an area where he may be less expert. In other words, the agent/participant/user has the ability to weigh the relative amounts that they are willing to bet or invest on these different schema areas and thereby make their own decisions about where they want to focus their bets/investments to develop a reputation and all the attendant things associated with that including the research, other investigations, and so on. Accordingly, because they are betting/investing along these schemas, their returns are similarly directed.

The feedback that the investors receive from the market also may be given along the schema. This allows a participant who is novice to enter in and make a variety of investments across different schema and learn from market feedback that they are actually good at predicting the adoption of technology, or that they might be good at the predicting the adoption of the market, or that they might be good at predicting at what Chinese like, etc. Thus, the feedback from the market is valuable to help the agents that are participating in the market learn about or discover their expertise. In addition, the managers of that market gain some benefit from this market feedback by learning about various peoples' expertise.

As an example, when a person started off with 10,000 virtual currency units and put them all on available invention activities (bets), and if none of them panned out, he would end up with zero currency. From this outcome, it can be assumed that he is probably not very good at many of his decisions.

Market Analysis

Many different aspects can be analyzed by the ILSS (for example, by the Market Manager and Analysis Engine 113 of FIG. 1). One thing the ILSS can examine is the specific sectors that were invested in so that the operator/decision maker can find people who invested in a specific sector (for example, the prediction of a given technology adoption), then analyze their investments to see if those who invested were good at it or not, and then stack rank them (or otherwise rank or order them) based upon their investments. To do this, the ILSS could look not only at the ones who succeeded, but also the ones who failed, in order to create a fair comparison to determine how far above the norm an investor is able to produce.

The operator of the Invention Network can also use the ILSS to look at other metadata to try to further cluster the analyzed information. For example, the ILSS can find people who are good at predicting technology and options. The ILSS may further find that, by looking at the metadata associated with each technology area, a person is actually very good at semiconductor technologies options but not so good at the instituting claims options. This information adds some value too.

The ILSS can also analyze the "multi-direct" case where people are spreading their bets to determine whether people are also self aware. In other words, do they stay set in areas where they obtain good results, or do they continuously tend to develop. Thus, the ILSS can observe an interesting investment behavior that sometimes occurs wherein people are found to always chase high return bets regardless of market feedback and, other cases, wherein people will only chase the safe bets and continue to invest in only the areas that they get positive market feedback. These behaviors give profiles of different kinds of investors/participants based on appetite for risk, appetite to try things new, and the like. The ILSS may find people who always have an appetite to try something new, but are always failing at it; yet find other people who are always trying something new, but specifically succeed at it better than most people. Typically, these latter people are very good at self assessing both their skills and the problem domain that they find new, so they don't leap into completely unknown danger, but do it in a measured way. These and other kinds of investor data and attributes can be determined by the operator/decision maker from this kind of structured approach to investing and data analysis effort.

Defining Success

There are several aspects and options that can be used to determine what constitutes a "good" or successful outcome. The top level goal for an example Invention Network is to have one or more "successful" inventions. As mentioned earlier, assuming an invention is ultimately patented, a successful invention can measured at the end of the day by whether it is licensed or transferred for a good economic return. That implies that the transfer must occur in the time frame that the patent that covers the invention. When there is a measure of success such as a particular patent has resulted in a tremendous amount of licensing dollars (and/or it is possible to attribute through other mechanisms licensing dollars to that particular patent), then it can be said that a number of the variables or the schema that were associated with that patent and the invention participants who bet on the success of that particular patent using those variables and schema are also successful. A synthetic return can thus be generated, real currency (e.g., licensed dollars) to virtual currency units, that creates a virtual currency return that is synthetically linked to the real return achieved from the licensing. However, determining this ultimate measure of success may take a very long time. Between the filing of the patent and its further continuation and divisional applications that may also have a lot of value, licensing may take years. Many participants would like to make investments in the portions of the invention (e.g., even back as early as the initial topic) and get feedback in a shorter amount of time. Thus, it is useful to examine some of the derivatives that occur to determine "partial success" in an invention and to accordingly reward the participants at a time earlier than when the invention has reached ultimate measurable (in real currency) success. Such nearer term rewards will attract earlier and better investment and thus contribute to the information available to the decision makers, thereby resulting in better choices of invention. Some of these derivative compensatory schemes were described above with reference to FIG. 1.

Generating or Developing Schema

For one example, examine the process of creating invention topics. When an invention topic is created, that topic may be populated with a set of criteria, which relate to predictions that would make the invention topic (area) very interesting. As an example, consider the ubiquitous camera. One of the predictions involved is that the cost of the sensors will continue to drop by Moore's Law Rule (which states approximately that the number of transistors that can be placed inexpensively on an integrated circuit will double approximately every two years; thereby making the cost of hardware half every two years). This is a kind of a technology prediction. There are other implicit assumptions in making something like the ubiquitous camera: for example, that the demand will continue to be high; that certain kinds of power distribution and information fusion problems will be solved; and so on. To the extent that those predictions are made, the Invention Network would like to articulate them as a topic. Some of those predictions will actually be the inventive area; for example, the invention may be to solve the power distribution problem. There are other assumptions that can be made when it is determined that the power distribution problem can be solved. Thus, the schema for this topic will involve numerous of these predictions.

Other examples abound. For example, topics that involve a shift from wired to wireless network can involve many different schema. These reflect an industry or business assumption that there will be a shift in consumer usage of, for example, the internet from wired networks to wireless networks because the deployment costs, and the like. Early on, bets may have been made based on whether that shift actually happens or not, or the period during which the wired and wireless industries are going head to head butting each other for supremacy. A lot of assumptions revolve around this basic prediction. Each of those assumptions, irrespective of whether the inventions there actually succeed, can be measured as to whether or not they come to pass and can be represented in a schema associated with some invention topic.

As another example, suppose there is an invention in power distribution for a ubiquitous camera. Regardless of whether that invention actually succeeds, there are parts of the schema for that invention that describe whether, for example, the Moore's Law effect of sensors continues or whether the data fusion problem has been solved. Experts might be betting just on these aspects of that invention. The success or failure of each aspect can be measured independently from the invention. So, for people who assert that "yes absolutely the Moore's Law trend for sensors will continue for the next 10 years, but here is what it is going to look like," maybe the ILSS could allow them to bet on this local trend. Moreover, that trend can be measured, year to year, and it can be determined whether or not the people who invested in that particular outcome are correct. So, as those predictions are true, that investor who is getting a return on those predictions becomes a better and better person at predicting some aspect of the future even if it is not tied to a particular single gadget.

People who are good at predicting some aspect of the future are very good contributors to an ability to invent accurately in the future. So whether they are business aspects or technology aspects, it is advantageous to measure the success of these investments in the context of invention.

It is possible for the Invention Network to have "inventions-naked" investments. In other words, topics that don't have an invention associated with them at all; they really are just themes to invest in. These may be less interesting than topics that are coupled to inventions. One reason may be that it is a to determine what the appropriate return is for something that is not coupled to an invention.

Thus, in deriving a schema, the ILSS can incorporate short term, long term, business oriented, technology oriented, or other aspects that are related to the invention itself, but not necessarily directly related to the invention.

Anonymity

In some embodiments, the system maintains account identity in order to determine "who" is an accurate predictor. In this case, people who are making investments are linked to specific (i.e., named or identified) people. If an account's identity is linked to a group of people, the ILSS may need to know that, or prohibit it, because behavior of a group is different than behavior of an individual, and measuring a group if the population of the group keeps changing may not achieve the desired goals. In addition, participants may be associated with multiple accounts. All and any such information may be tracked by the ILSS.

In other embodiments, for example, those where trend information is all that is desired, or where information about the investors or best predictors is not relevant, anonymity at some level is permissible. For example, it may be sufficient to associate the trend with a group identifier or with an anonymous identifier. Other combinations are possible.

Delegation and Pooling of Assets

The structured system for investing in inventions in the Invention Network includes several phases of invention activity, as described with reference to FIG. 2. Each phase allows the Invention Network to appeal to a broader population for wisdom regarding inventing. When dealing with a large number of topics or inventions or licensable patents, it is extremely expensive to spend an equal amount of effort, technical, legal and business efforts on every aspect. So with 10 assets, one can spend a lot of effort on each asset, but with 20,000 assets it becomes more difficult to spend a lot of effort on each asset. Accordingly, the Invention Network techniques attempt to distribute the problem to a larger network of people to look at, where the broader population can amortize their effort and decide lots of different ways of prioritizing which assets are important. Using the ILSS techniques, people who have a very, very strong feeling about a particular invention activity will rise above the noise, because they get a currency—not just one vote—that they can use to vote across assets, characteristics, people, risk, and the like. So, somebody who feels very strongly about an asset or activity would be more likely to put a lot of currency down on that asset.

Likewise, people who have expertise in an invention activity, as in the reputon case, can help the Invention Network select participants who are likely to have opinions that really matter by giving them more currency to invest. This technique allows the people with opinions that really matter to rise above the noise, which in turn allows the Invention Network to use a very large population of people who are making their own investment decisions. In the long run, this is a less expensive way to determine quality of invention activities and to triage assets than assigning priorities to them, for example, top down. Over time, interesting information is discoverable about the relationship between schema, invention, risk, compensation, etc.

Similar to reputons, investors in the Invention Network also are able to invest in other investors' tasks. So investors are able to act as agents not only for their own currency but also for those of others investors. This means that Investor A who finds Investor B interesting, smart and/or wise, can decide to delegate or invest part of his currency in that investor (Investor B in this case). Investor B can then use that currency as if it were his own and, therefore, invest on behalf of Investor A. This is termed "delegation."

The ILSS can generate rules that allows Investor B, who is investing on behalf of Investor A, to get an additional return for doing so. In other words, Investor B would earn an amount like a "carried interest" or a "profits interest" in whatever Investor B earns on behalf of Investor A. This amount bears against any overhead associated with Investor A getting a return. Much like a private equity or venture capital fund, the additional return would generally be in the form of a profits and trust, but it may also include an associated "management fee." In some embodiments, where there is no real overhead, no such fee is charged. However, lots of different models exist for calculating this overhead, and any of them could be utilized by the techniques of the Invention Network.

Investments also may be delegated within a schema. For example, if Tom is Investor A and Jill is Investor B and Tom believes Jill will make very good choices in the IT sector or predictability of technology, but Tom is not exactly sure whether Jill will make really great choices in the bio-tech sector, or the business side, or the market side, then Tom should be able to confine Jill's use of his currency to schemas that Tom believes Jill is good at.

This form of delegation is like the investment theme of an investment fund, but it is also a way of defining permissions on using capital for that area. The ILSS is able to track these delegated investments to find who is developing both a potential reputation, in other words people who are making investments, as well as actual reputation, in other words people who are actually making returns towards success. What this means is that different investors may have specialized capital accounts, including X-number of currency units of their own, where they are managing Y-number of currency units of other people for a given schema area and Z number of currency units for different schema areas.

Some embodiments support investment clubs, which include a group of investors. In some embodiments, as explained above, each has to register as an individual for tracking purpose. In other embodiments, no individual registration is required. Investment club embodiments may employ a special set of rules that involve pooled capital, again in different areas and schema, that allow them to act as clubs with either a nominated or a pool of people who are authorized to make the decisions. In this case, investor A, B, C, and D are all in the pool together. People may wish to pool their investments for a variety of reasons. For example, groups may be determined by the investors themselves ahead of time, they may be ad-hoc groups formed during or associated with the investment process or they may be prearranged clubs organized by the ILSS, such as a silver, gold, and platinum investments group charged with different benefits.

Computer Program Accounts

Some embodiments of the Invention Network support accounts for computer program training. These accounts operate like human accounts, but there are actually computer programs behind them (e.g., computer agents). Participants in the market are encouraged to develop computer programs to try to participate. In some cases, these participants will "program trade," that is, they will actually contribute the program to the Invention Network. One reason for contributing the program as opposed to keep it proprietary is that the Invention Network may allow a program that actually executes on a computing system within the Invention Network system to execute faster and with more real time data. Another reason is that the Invention Network may syndicate that program and share revenues with the author. In this way the Network will try to discover from the market, by harnessing the wisdom and the creativity of others, a trusted program that someone actually can use to gain useful invention activity information.

Allocating Returns

There are multiple ways for an Invention Network to allocate returns (and interim rewards) across schema, participants, delegations, pools, and the like. In the case where participants are betting on a particular invention, the returns are pretty clear. They can be some kind of percentage, a straight line percentage, or a scaled return linked to the economic return of the invention. But, there are cases where an investor is not betting on a single invention but is betting on a trend. The trend may be associated with (or attached to) possibly many inventions. In this case some proportion of the net return (yet unknown) needs to be allocated to a portfolio of investments, all linked to the trend.

For example, imagine a set of investments that are linked to the shift from wired to wireless networks. Suppose the Invention Network has literally hundreds of inventions in that area. Now, the hope for the operators of the Invention Network is that at least a small number of those inventions will succeed and generate a very large return, which will more than make up for all of the other inventions in that area that will not succeed. In general, the Invention Network investment model is conservative and assumes that only a small percentage of the inventions in a given area will succeed, like a venture capital model. So, when people are not investing in a single invention, but are investing in a scheme or an attribute across a multiple inventions, it is prudent to scale the investment returns to a blended total return over all of those inventions.

As an analogy, investing in inventions in this manner is similar to betting at the roulette wheel. If you bet on a single invention, it is like betting on a specific number which would give a high return only if you managed to choose it correctly. However, or, if you pick out the odds and evens, 22, 30, or the theme of "red," this is like investing in a "scheme" (e.g., theme of "red") across multiple inventions, and pays out accordingly. The ILSS similarly can compute returns for investments across schemas.

In addition, participants may pool their investments and be investing in groups tailored to particular themes, topics, areas, skills, or the like or ad-hoc groups, for example, those created using the communication available in a social network, linked by interests, or the like. The investment returns need also to be scaled to accommodate these internal divisions.

As described earlier with regard to portfolio investments, a participant can make investments across lots of different areas by picking certain areas of schema. One such area could be all inventions. In that case the participant would be making an investment of virtual currency in all inventions, which is like making an investment in the fund. Such an investment (all inventions) is less helpful in developing any kind of expertise. In this case, the ILSS can be set up to reward a schema that reflects a balance in the areas in which one can invest between areas that actually give discovery value from ones that do not.

Returning to the example about betting on the Moore's Law curve for camera sensors, typically, the return available should not be equivalent to the return on making a bet on whether the meta materials are going to be easily fabricated, because one outcome is much more probabilistically likely to happen. In the cases where the return is based on a fixed probability, like the roulette wheel, one can merely look up the probability in a table and then compute the interior odds using just probability theory.

The other cases and techniques that can be incorporated are similar to what bookies (bookmakers that allocate winnings) do for sports betting. That is, bookies actually look at the population of betters, determine how the population is distributed, and compute the probability based on that distribution. In this case, there should essentially be no return if everybody bets on the Moore's Law holding true for camera sensors. On the other hand, if there is a population that bets against it, their returns should be high if their prediction holds true. However, the ILSS has to make sure this probability is correctly computed with a potential cost function associated with it. Otherwise people will arbitrage the system by betting both sides in order to get a return. Further, when participants bet on both sides of something that is an exclusive "OR," (a one side or the other proposition) they should not be able to generate a return, they should always generate some small loss.

Otherwise, the system would be too costly, because the cost of running the system is not taken into account if everybody gets paid either way. The "house" accrues some cost, which needs to be a part of the betting. Otherwise, by making the system completely free to invest, then people will create computer programs to do game the system and place millions of bets, which will just overwhelm the system and distort the economics. So the overhead is consumed in the cost of the investment or subtracted from the potential return.

In allocating interim rewards, the Invention Network moderators, operators, decision makers, administrators, or the like (hereinafter moderators unless specifically noted), or other internal ILSS processes, make assessments at different time periods (e.g., predetermined by time or events) to determine whether somebody is good at predictions. For example, the moderators can check each year to see if the predictions along a schema are becoming "more" true. There are two ends to determining this, one is using a specific measurable metric. So, for example, relative to the wired versus wireless network prediction—if the wired bets are winning then the moderators can look at a basket of wired stocks and see if their value is going up more than a basket of wireless stock. This technique is a way of linking success specifically to a clear metric. In addition, participants may invest in the form of hedges and/or offsets which are commensurately computed.

The other one is to use a judge. If the judge is simply "house discretion," then the moderators of the Invention Network judge the investments and determine whether they are going this way or that way, or no decision. In such a system, the moderators of the Invention Network have every incentive to be a fair judge. None of the moderators (the "house") would game the system, because the system doesn't accrue any advantage since it would otherwise distort all the data for refining predictability, finding better inventors and inventions, and to triage participants over time.

The determination and/or computation of rewards is performed at various events, times, intervals, or the like, some of which were described with reference to FIG. 1. Some embodiments of the Invention Network quantize time similar to other markets (other than the invention activity market). There are at least two ways time can be quantized. One is to quantize by the clock or a time period when things are trued up or computed, similar to the notion that the stock exchange is settled at the end of the day. In some implementations, there is a daily settlement during which the accounts are debited along with other related activities, rather than settling the accounts continuously. One potential disadvantage to daily settlement is that it causes a flurry of activity toward the beginning and the end of every day. Because the Invention Network is a global market and is intended to be running all over the world (all of the time), settling at a particular time of day may not make any sense in some embodiments. Nevertheless, it can be done.

In some cases, quantized time is published as part of the investment information so participants in the Invention Network know when the settlements are computed. The quantized time may not be on a daily basis for some things. In some instances, for example on a quarterly basis, the market predictions that investors have made will be quantized. For example, referring to prior examples, this is the time when the moderators look at the stock markets and determine whether the predictions have come to bear. One of the reasons for quantizing quarterly as opposed to daily is to drive more activity into the market over a certain time period. If investments were quantized daily, perhaps less than one investment will be made per day. In this case the market is thin and there is not much action in the market as it gets settled every day. On the other hand, if the investments are rolled up once per quarter, than at least maybe there are, for example, a hundred investments to examine in that quarter and potentially interesting information to glean.

The other way time can be quantized is by event. The ILSS can quantize certain kinds of events like the patent office issuing a set of patents, which are generally announced on a schedule (e.g., once per week). For example, the system can quantize patent issuance, patent or patent application publication, and other events that contribute to the probability that an invention is going to be successful. In addition, there may be events associated with the release of a product which are also interesting and may contribute to the probability that an invention is going to be successful. One can imagine after a set of inventions have been issued as patents that some number of investors are watching those patents and potentially related products. It may be beneficial to scour product announcements to quantize these events. Investors will potentially be looking for events that signify when those product announcements are coming out and at events when the product actually does come out, or is announced, or rumors. These are similar to the sorts of events observed with stock speculation. In fact, it is possible that the investors will even speculate on related stocks, to hedge their own invention activity investments. Nonetheless, these are all kind of "event-based" quantization. Accordingly, publishing a schedule of at least some of the events that are predicable may be useful to help drive market activity. It is similar to how events operate in a futures market in commodities: there are various very important dates when commodity information is actually published, for example, there is a weather prediction report, and so on, and these happen at very well known dates.

Obtaining Money/Virtual Currency

Different embodiments of the ILSS provide various mechanisms for obtaining money and/or virtual currency. In one embodiment, initial participants are granted allocations or put on salary. Currency, real or virtual, is then issued in accordance with the grant or salary. For example, similar to starting a Monopoly game, a participant might get a certain amount of money at the beginning and a stipend for multi-participation. That participation could be predicated on certain activities, for example, that they actually have to make investments or that they have to participate in the Invention Network a certain amount, otherwise they drop out and are no longer salaried.

In addition, currency can be issued for a variety of performance objectives, which may not be strictly tied to investment return. For example, in order to stimulate the market, currency may be initially issued based on the actual number of investments made. Later, the fixed cost of investment may be adjusted up or down to encourage people to make investments in one area or another. In addition, the returns that are allocated to a particular investment schema may be adjusted, again, in order to attract activity into a particular area. Thus, there is some part of the market that can be managed by issuing currency and/or by reducing or increasing cost and/or allocating returns.

As described earlier, some embodiments use a "bookie model" of computing of the return probability to allocate returns. This model computes returns between a bet and a counter-bet, but the amount of the total return that is allocated to the bet/counter-bet can be separate from that. For example, if the total return of an invention is one million dollars and it is linked to a hundred thousand currency units, and then suppose 10% of that is for the technology prediction, the ILSS could change that percentage to 12% or 15% or 5% depending on the time the total return is set. So, people are encouraged to invest 15% for the first year, and the people who invest after that receive that 15% allocation (for that particular year) scaled to the next year, etc. However, the interior probability of betting whether you are betting long or short on that technology prediction would be done using the bookie model, so investors can't arbitrage it by betting both sides.

In some embodiments the currency allocated is real currency and in other embodiments the currency is virtual or some combination of both. One way to get the equivalent of virtual currency is by having other people invest in you (a delegated investment). In some embodiments there may also be a notion of virtual currency provided for "work for hire."

In some embodiments, virtual currency once obtained may be converted to actual real money at some point. With respect to linking virtual currency and actual real dollars, in some jurisdictions there may be some regulatory issues about whether virtual currency can convert easily into dollars or not. According to one approach, each investor is under contract in one form or another, so the return is a way of tying their compensation to this other activity.

In other embodiments, an investor is able to cash out virtual currency directly for dollars. In some embodiments, an investor cannot do the reverse—an investor is not be able to cash in dollars for virtual currency. This is because the main reason to cash out virtual currency for dollars is to create more incentives for people to actually participate. If, on the other hand, one were able to put a million dollars into the system and get virtual currency, then the system is mistakenly linking economic return today to the skills of interest. The system does not wish to create an incentive for someone who just happens to have a million dollars lying around to go out and suddenly establish a great virtual currency reputation in a desired area. However, some embodiments do not preclude this behavior.

In addition, there are other forms of currency that may count rather than investing dollars. For example, suppose a participant could invest in the average citations of his papers or patents. So, if he had an interesting number of patents normalized and his patents were highly cited, then he would enter the Invention Network with additional virtual currency. The Invention Network might then let him convert these into virtual currency in the area of patentability prediction. Or suppose the participant is a patent attorney and the Invention Network is able to verify that he has authored lots of patents to and they have ended up in "interesting" places by some measure, then that participant might start off with more virtual currency. This technique yields a type of "in-kind" trade rather than dollars for virtual currency.

Without explicit rules forbidding such behavior, the techniques of the ILSS permit someone to do a very interesting arbitrage. For example, suppose the participant is a patent attorney that has filed 500 patents of high quality. Further suppose that the Invention Network allows one to immediately convert them into 100,000 units of virtual currency. Using this currency, the patent attorney participant can make very safe bets and then turn around and immediately pull out the returns as real money. He has now directly monetized his patent filings into real dollars. Thus, the ILSS may incorporate a set of rules to inhibit or reduce the likelihood that people are going to turn the Invention Network system into some kind of "in-kind" bank. For example, the ILSS may incorporate a holding period before which an investor cannot turn the returns into money. Or, investors may have to invest their dollars "through" a risk before pulling them out as real dollars. Other permutations are possible.

In one embodiment, only gains (return dollar/virtual currency) can be pulled out and exchanged for real money. In other words, a participant can pull out only the gains that have been received through investment and not the dollars initially allocated may or the "income" initially given to participate in the network. The gains could be tracked to delegated investments as well.

The ILSS can perform lots of actions on the conversion from virtual currency out to cash. Of course, when a participant converts out to cash he loses his virtual currency (he is pulling out of the market), but the Invention Network can implement incentives for people not to. For example, there may be an immediate reduction of the cash amount if it is pulled it out all at once. Or, perhaps the participant is allowed to instead convert it into an annuity and not suffer that reduction; the money that results becomes more predictable for the Invention Network. Or, perhaps the participant actually earns interest on any virtual currency that is kept in the system; thus virtual currency earns a rate of return which incents the participant to keep the virtual currency in the system.

All of the above U.S. patents, U.S. patent application publications, U.S. patent applications, foreign patents, foreign patent applications and non-patent publications referred to in this specification and/or listed in the Application Data Sheet, including but not limited to U.S. Provisional Patent Application No. 61/265,680, entitled "INFORMATION DISCOVERY USING STRUCTURED INVESTMENTS IN AN INVENTION NETWORK," filed Dec. 1, 2009, is incorporated herein by reference, in its entirety.

From the foregoing it will be appreciated that, although specific embodiments have been described herein for purposes of illustration, various modifications may be made without deviating from the spirit and scope of the present disclosure. Also, the methods and systems discussed herein are applicable to differing protocols, communication media (optical, wireless, cable, etc.) and devices (such as wireless handsets, electronic organizers, personal digital assistants, portable email machines, game machines, pagers, navigation devices such as GPS receivers, etc.).

The invention claimed is:

1. A method for facilitating allocation of resources within an invention pipeline, comprising:
   under control of a computing system having a memory and a computer processor,
   allocating currency to a plurality of participants in an invention market;
   transmitting to the plurality of participants information about multiple invention activities; and
   receiving indications from each of the plurality of participants of an investment of some portion of the currency allocated to the respective participant, the investment indicating a predicted measure of success of at least one of the multiple invention activities; and
   selecting at least one of the invention activities as a candidate for further development as a patent application, based at least in part on the investments of the participants.

2. The method of claim 1 wherein each invention activity is characterized according to a schema and each participant investment is associated with one or more aspects of the schema to enable the participant to indicate by schema investments in invention topics or in invention disclosures.

3. The method of claim 1 wherein the currency is allocated in a virtual currency.

4. The method of claim 1, further comprising;
   determining whether one of the selected invention activities has been successful; and
   rewarding the participants that initially indicated investments in the one invention activity in accordance with their respective investments.

5. The method of claim 4 wherein rewarding the participants is based upon the indicated investment and subsequent investments.

6. The method of claim 4 wherein rewarding the participants includes allocating an amount of virtual currency to the participants.

7. The method of claim 6, further comprising:
   converting the virtual currency to real money.

8. The method of claim 1 wherein at least a portion of the currency allocated to one or more of the participants comes from other persons, such that the one or more participants can perform delegated investments on behalf of the other persons.

9. The method of claim 1, further comprising:
   providing tools to permit the participants to communicate with other participants.

10. The method of claim 1 wherein each of the multiple invention activities includes at least one of determining an invention topic area, populating an invention topic area, triaging at least one invention topic area, soliciting inventions for an invention topic area, triaging at least one invention, procuring rights in an invention, and/or exploiting rights in an invention.

11. The method of claim 1 further comprising:
    facilitating decision making regarding allocation of resources amongst the multiple invention activities.

12. The method of claim 1, further comprising:
    transmitting information about the selected at least one candidate for further development, so as to facilitate decision making regarding allocation of resources towards one or more invention activities.

13. The method of claim 1 further comprising:
    facilitating identification of promising invention activities.

14. The method of claim 1 further comprising:
    facilitating identification of promising invention topic areas by transmitting descriptions of invention topic areas.

15. The method of claim 1 further comprising:
    facilitating the identification of promising invention ideas by transmitting descriptions of invention ideas, the descriptions including an invention abstracts, summaries, or overviews.

16. The method of claim 1 further comprising:
    facilitating identification of promising patent applications to prepare, acquire, or file by transmitting portions of patent applications, the portions including claims, figures, abstracts, and/or patent text.

17. The method of claim 1 further comprising:
    facilitating identification of promising patent applications to further prosecute by transmitting portions of prosecution file histories for the patent applications.

18. The method of claim 1 further comprising:
    facilitating identification of promising patents to license by transmitting information regarding issued patents.

19. The method of claim 1, further comprising;
    determining whether one of the described invention activities has been successful; and
    rewarding the participants that indicated investments in the one invention activity based on their respective investments and/or whether the one invention activity has been successful.

20. The method of claim 19 wherein determining whether one of the described invention activities has been successful includes determining whether a patent application has been filed for an invention idea of the one described invention activity.

21. The method of claim 19 wherein determining whether one of the described invention activities has been successful includes determining whether a patent application has issued into a patent.

22. The method of claim 19 wherein determining whether one of the described invention activities has been successful includes determining whether an issued patent has been licensed and/or whether an issued patent has been purchased or otherwise transferred.

23. The method of claim 19 wherein determining whether one of the described invention activities has been successful includes determining whether an invention disclosure has been selected for preparation of a corresponding patent application.

24. The method of claim 19 wherein determining whether one of the described invention activities has been successful includes determining whether an invention idea has been selected for further development into a corresponding invention disclosure.

25. The method of claim 19 wherein determining whether one of the described invention activities has been successful includes determining a vote of one or more participants.

26. The method of claim 19 wherein determining whether one of the described invention activities has been successful includes determining some objective measurable characteristic related to the one of the described invention activity.

27. The method of claim 19 wherein determining whether one of the described invention activities has been successful includes determining an average rating for the one invention activity based on ratings provided by each of the participants.

28. The method of claim 27 wherein rewarding the participants includes rewarding each participants based on how close the rating provided by the participant is to the determined average.

29. The method of claim 27 wherein determining the average rating includes weighting each of the ratings based on reputation of the participant that provided the rating.

30. The method of claim 1 wherein selecting the at least one invention activity includes assessing the invention activities based on ratings provided by each of the participants.

31. The method of claim 1 wherein selecting the at least one invention activity is performed using an opinion market.

32. The method of claim 31 wherein the selecting the at least one invention activity includes assessing the invention activities by allowing each participant a vote weighted by reputation.

33. The method of claim 32 wherein the selection occurs and the opinion market is closed when at least one of a sufficient mass of opinion has been received, when distribution of opinions meets a threshold significance level, and/or when a rule that defines closure of the opinion market is met.

34. A non-transitory computer-readable medium whose contents enable a computing system to facilitate allocation of resources within an invention pipeline, by performing a method comprising:
   transmitting to a plurality of participants information about multiple invention activities;
   receiving indications from each of the plurality of participants of an investment of currency allocated to the respective participant, the investment indicating a predicted measure of success of one of the multiple invention activities;
   selecting at least one of the invention activities as a candidate for further development as a patent application, based at least in part on the investments of the participants; and
   transmitting an indication of the selected at least one invention activities.

35. The computer-readable medium of claim 34 wherein the method further comprises:
   allocating currency to a plurality of participants in an invention market.

36. The computer-readable medium of claim 35 wherein the allocated currency is a virtual currency.

37. The computer-readable medium of claim 36 wherein the method further comprises:
   accepting an amount of the allocated virtual currency in exchange for a corresponding amount of real currency.

38. The computer-readable medium of claim 37 wherein the virtual currency is accepted for exchange only after the virtual currency has been used to invest in an investment activity.

39. The computer-readable medium of claim 34 wherein the method further comprises:
   facilitating a triage of multiple invention activities, based at least in part on the investments of the participants.

40. The computer-readable medium of claim 39 wherein the triage of multiple invention activities include at least one of a triage of invention trends, invention topics, invention ideas, and/or patent application descriptions.

41. The computer-readable medium of claim 34 wherein each invention activity is characterized according to a schema and each participant investment is associated with one or more aspects of the schema.

42. The computer-readable medium of claim 34, the method further comprising:
   allocating a reward to one or more participants based upon a predicted measure of success of the selected at least one of the invention activities.

43. The computer-readable medium of claim 34, the method further comprising:
   determining whether the selected invention activity has been successful; and
   rewarding the participants that initially indicated investments in the one invention activity in accordance with their respective investments.

44. The computer-readable medium of claim 34 wherein the selecting the at least one invention activity includes assessing the invention activities based on ratings provided by each of the participants.

45. The computer-readable medium of claim 34 wherein the selecting the at least one invention activity is performed using an opinion market.

46. The computer-readable medium of claim 45 wherein the selecting the at least one invention activity includes assessing the invention activities by allowing participants a vote weighted by reputation.

47. The computer-readable medium of claim 46 wherein the selection occurs and the opinion market is closed when sufficient votes have been received, when the distribution of the votes meet or exceed a level of statistical significance, and/or when a rule that defines closure of the opinion market is met.

48. The computer-readable medium of claim 34 wherein the transmitting the indication of the selected at least one invention activities comprises storing an indication of the selected at least one invention activities in the computer-readable medium.

49. The computer-readable medium of claim 34 wherein the transmitting the indication of the selected at least one invention activities comprises forwarding the indication of the selected at least one invention activities to a module for computation of an interim reward.

50. The computer-readable medium of claim 34 wherein the computer-readable medium is a memory in the computing system.

51. The computer-readable medium of claim 34 wherein the contents are instructions that when executed cause the computing system to perform the method.

* * * * *